(12) United States Patent
Shunturov et al.

(10) Patent No.: US 9,958,291 B1
(45) Date of Patent: May 1, 2018

(54) SELF-SERVICE CONNECTION, DATA COLLECTION, AND AUTOMATION OF METERING AND BUILDING SYSTEMS, CONTROLS, AND DEVICES

(71) Applicant: Lucid Design Group, Inc., Oakland, CA (US)

(72) Inventors: Vladislav Kantchev Shunturov, San Francisco, CA (US); Gavin Matthew Platt, Oakland, CA (US); Thomas Winston Geer, Morgan Hill, CA (US)

(73) Assignee: ABL IP Holding LLC, Atlanta, GA (US)

( * ) Notice: Subject to any disclaimer, the term of this patent is extended or adjusted under 35 U.S.C. 154(b) by 178 days.

(21) Appl. No.: 14/805,205

(22) Filed: Jul. 21, 2015

Related U.S. Application Data

(60) Provisional application No. 62/035,845, filed on Aug. 11, 2014.

(51) Int. Cl.
*G01D 4/00* (2006.01)
*H04L 29/08* (2006.01)

(52) U.S. Cl.
CPC ........... *G01D 4/002* (2013.01); *H04L 67/125* (2013.01)

(58) Field of Classification Search
CPC ....... H04L 67/125; G01R 22/06–22/10; G06Q 50/06
See application file for complete search history.

(56) References Cited

U.S. PATENT DOCUMENTS

| | | |
|---|---|---|
| 6,002,398 A | 12/1999 | Wilson |
| 6,341,270 B1 | 1/2002 | Esposito et al. |
| 7,076,434 B1 | 7/2006 | Newnam et al. |
| 7,076,504 B1 | 7/2006 | Handel et al. |
| 7,823,068 B2 | 10/2010 | Cowtan et al. |
| 8,176,095 B2 | 5/2012 | Murray et al. |
| 8,375,068 B1 | 2/2013 | Platt et al. |
| 2002/0178047 A1 | 11/2002 | Or et al. |
| 2003/0126151 A1 | 7/2003 | Jung |
| 2003/0177176 A1 | 9/2003 | Hirschfeld et al. |
| 2003/0182250 A1 | 9/2003 | Shihidehpour et al. |

(Continued)

OTHER PUBLICATIONS

Da Cruz, "Monitoring E-Business Web Services Usage through a Log Based Architecture", Web Services 2004, Proceedings IEEE International Conferences on Jul. 6-9, 2004, pp. 1-10.

(Continued)

*Primary Examiner* — Laura Nguyen
(74) *Attorney, Agent, or Firm* — Raubvogel Law Office

(57) ABSTRACT

A system and method may be used to control a plurality of services for one or more facilities. A data store may receive a first meter catalog that identifies a first meter, and a second meter catalog that identifies a second meter. The data store may also receive first and second meter readings from the first and second meters. The first and second meter readings may be indicative of provision of services to the one or more facilities. A processor may automatically process the first and second meter readings to provide first and second processed meter readings that are more readily understood by a user. A display screen may display the first and second processed meter readings. An input device may receive user input that establishes control and/or user reporting related to provision of the services.

32 Claims, 35 Drawing Sheets

(56) References Cited

U.S. PATENT DOCUMENTS

| | | | |
|---|---|---|---|
| 2003/0191683 A1 | 10/2003 | Bailey | |
| 2005/0096975 A1 | 5/2005 | Moshe | |
| 2005/0132041 A1 | 6/2005 | Kundu | |
| 2005/0182750 A1 | 8/2005 | Krishna et al. | |
| 2005/0246229 A1 | 11/2005 | Goldstein | |
| 2005/0251440 A1 | 11/2005 | Bednarek | |
| 2006/0178918 A1 | 8/2006 | Mikurak | |
| 2006/0190319 A1 | 8/2006 | Hanswadkar | |
| 2007/0162292 A1 | 7/2007 | Bell et al. | |
| 2008/0097782 A1* | 4/2008 | Budike, Jr. | G01D 4/004 705/63 |
| 2009/0167558 A1* | 7/2009 | Borleske | G01D 4/002 340/870.07 |
| 2010/0100253 A1* | 4/2010 | Fausak | G01D 4/002 700/295 |
| 2011/0063126 A1* | 3/2011 | Kennedy | G01D 4/002 340/870.02 |
| 2012/0046890 A1* | 2/2012 | Pennington | G01D 4/002 702/61 |
| 2014/0129499 A1* | 5/2014 | Hawkins | G06N 3/02 706/46 |
| 2014/0365174 A1* | 12/2014 | Arlitt | G06Q 50/06 702/182 |
| 2016/0018835 A1* | 1/2016 | Gaasch | G05F 1/66 700/291 |
| 2016/0378127 A1* | 12/2016 | Scelzi | G06Q 10/00 700/295 |
| 2017/0052536 A1* | 2/2017 | Warner | G06Q 10/06312 |

OTHER PUBLICATIONS

Thompson, Clive, "Clive Thompson Thinks: Desktop Orb Could Reform Energy Hogs", in Wired Magazine, Issue 15.08, Jul. 24, 2007.

"Wattson", printed from www.diykyoto.com/wattson.html (printed on Jan. 8, 2008).

"Wattson—How it Works", printed from www.diykyoto.com/howitworks.html (printed on Jan. 8, 2008).

"Wattson—Features and Benefits", printed from www.diykyoto.com/features.html (printed on Jan. 8, 2008).

"Wattson—Community", printed from www.diykyoto.com/community.html (printed on Jan. 8, 2008).

* cited by examiner

SELF-SERVICE CONNECTION, DATA COLLECTION, AND AUTOMATION OF METERING AND BUILDING SYSTEMS, CONTROLS, AND DEVICES

CROSS-REFERENCE TO RELATED APPLICATION

The present application claims priority from U.S. Provisional Application Ser. No. 62/035,845 for "Self-Service Connection, Data Collection, and Automation of Metering and Building Systems, Controls, and Devices,", filed Aug. 11, 2014, which is incorporated by reference herein in its entirety.

TECHNICAL FIELD

The present document relates to connection, data collection, and automation of metering and building systems, controls, and devices.

DESCRIPTION OF THE RELATED ART

Many businesses, schools, governments, and other industry groups manage buildings and other facilities in which a variety of utilities and other services are utilized. The gathering and utilization of data from such services can be complex, time-consuming, and expensive for facilities management personnel and other stakeholders who need access to these data. Without ready access to utilization data, it can be very difficult for these actors to identify or enable changes that could be used to eliminate waste and/or reduce the consumption of power, water, gas, and/or other resources; optimize the comfort of building occupants; and increase the productivity of their workforce.

Systems integration is one of the greatest challenges in the buildings industry. It is high-cost, proprietary, slow, and does not resemble the software-as-a-service model that innovative companies use to deliver revolutionary products today. Accordingly, it would be beneficial to provide systems and methods whereby data regarding the utilization of various services can be gathered and effectively used by diverse teams to make informed decisions regarding facilities management.

SUMMARY

In at least one embodiment, the systems and methods described herein may provide a central operating system for buildings that can significantly reduce or eliminate systems integration costs. This may facilitate deployment of the latest hardware or software from any vendor by allowing for instant connections.

In at least one embodiment, the operating system provides a streamlined user interface that avoids the need for the user to log into several very different systems for every building, system, or device, thus fundamentally changing the way users can interact with technology in buildings. The described system may thus provide a way to integrate information from various systems into a single, modern platform that all individuals within an organization can use for management, analysis, and/or control, as applicable.

As such, the operating system for the control of systems and devices as presented herein can fundamentally change how and where automation takes place. The system may facilitate development and deployment of new methods of control that use one or more control modes, sometimes in combination. Such methods of control may include, but are not limited to:
- Scheduling-based control;
- Demand-based control;
- Budgeting-based control;
- Proximity-based control;
- Alert-based control;
- Notification-based control; and/or
- Behavior-based control.

Accordingly, various embodiments provide a system, method, and/or user interface whereby users can perform functions that may include, but are not limited to:
- Instantly connecting building systems, meters, sub-meters, controls, sensors, devices, as well as other data services and software to automatically discover remote systems and data;
- Centrally collecting, processing, and/or storing data; and
- Automating the monitoring, configuration, and control of systems and devices.

Such techniques can be used to solve problems such as:
- System and device interoperability;
- Self-service implementation of systems, meters, and devices;
- Multi-modal, multi-system control; and/or
- User interface challenges stemming from a centralized repository of information and diversity of implementation and advanced control sequences.

The software platform for implementing the operating system is referred to herein as "BuildingOS." The functionality for self-service, automated, and/or one-click connection of systems is referred to as "ConnectNow." These names are provided for ease of reference only, and are not intended to limit scope or applicability of the present disclosure.

In at least one embodiment, BuildingOS serves as a central repository or "hub" for utility meter data, sub-meter data, building controls data, billing data, and/or other building metrics. A software-as-a-service (SaaS) platform may aggregate data from metering and building technologies. Such metering and building technologies may include, but need not be limited to:
- Building automation systems;
- Sub-meters;
- Lighting and plug load controls;
- On-site generation systems;
- Demand response providers;
- Electric and gas utilities;
- Cloud-to-cloud data services; and/or
- Other services and systems.

In at least one embodiment, BuildingOS provides intuitive data management and analytical tools for deriving value from this information. To integrate a technology or data service, users may connect their system, meter, or device through a single user interface. BuildingOS may provide intuitive multi-modal and/or multi-system scheduling and control of systems and devices.

BuildingOS may provide several advantages over prior art systems. Examples of such advantages may include, but are not limited to, the following:
- BuildingOS may be hardware and/or software vendor-agnostic. It may expose a catalog of all supported technology and data service integrations from different vendors. As new technologies and/or vendors become available and are supported, they may be browsed and connected to.

Users may have the ability to self-service and/or self-commission technology and data service integrations without the need of remote or on-site support. Users may input a token or other credentials that allow them to identify the remote system, connect it, and service or control it.

System, meter, and/or device discovery may happen automatically. Once connected to a remote system, BuildingOS may map all available meters or data points.

Data collected from all technologies and data services may exist in a single database for analysis, reporting, and/or other forms of assessment as well as occupant engagement and control.

Device grouping and tagging may allow for the intuitive categorization, classification, grading, and/or ranking of individual systems, meters, and/or devices. Placing them in groups and/or or assigning a tag may enable the creation of new meta-entities in the system that can be added to and manipulated for data collection, data analysis, automation, and/or control.

A notifications engine may inform users about the connection status of systems, meters, devices, and/or other data services and software. This may be done by detecting signals, failures, spikes, and/or flatlines. Questionable readings may be automatically quarantined and/or reported.

The user interface may unite information and/or controls from many disparate systems, meters, and/or devices into a single location. The user interface may be easy to use and may enable new audiences to interact with systems that previously did not provide them with access or control.

A visual language of controls, sequences, and/or actions may provide the user with a rapid and intuitive way to create simple or complex operations for the automation, scheduling, and/or control of systems, devices, groups, and/or other derived or meta-representations of these same systems, devices, and groups. Much like structuring a sentence, users may dictate the precise operations they wish to make happen without prior knowledge of advanced automation systems. Suggestive and/or conditional sequences and actions may allow for users to quickly learn how to compose an operation.

A visual representation of the geospatial placement of systems, meters, and/or devices may enable users to intuitively map data sources to physical locations.

According to the techniques described herein, BuildingOS may further have characteristics including, but not limited to, the following:

It may be vendor-neutral, and therefore may have the ability to connect to any service or device.

It may provide a centralized repository for all building information, from an individual sensor or device up to a building or real estate portfolio with many facilities.

It may be self-service, and thus may require no on-site integration.

It may provide a user interface for novel applications in energy efficiency, building management, data management, automation, and/or control, for example:

The system may provide a user interface for systems, meters, and/or devices for a) whole-building or portfolio-wide analysis, and/or b) cross-system or multi-system-dependent scheduling and control. The system may provide a significant upgrade over known systems lacking such a user interface because the known systems were not originally created to expose settings or controls to a user, or because of the systems-integrated, data-aggregated, and cross-vendor nature of pulling data from multiple disparate systems.

The user interface may also include a visual language of controls, sequences, and/or actions. Optionally, the user interface may provide assistance and/or suggestions that help the user to establish conditional controls, notifications, and/or other control operations.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 24 is a screenshot diagram illustrating a Meters subpage, according to one embodiment.

DETAILED DESCRIPTION OF THE EMBODIMENTS

In at least one embodiment, the system and method described herein facilitate the receipt of data regarding services provided to one or more facilities from various sources such as meters from utilities and other service providers. In some embodiments, such data sources may be automatically connected to a database. The data received from such data sources may be processed in a manner that facilitates user comprehension and/or decision making. The data may be displayed for a user, and he or she may direct the system to take various control actions, which may be activated based on various conditions regarding future data received from the data sources.

Figure 1A:
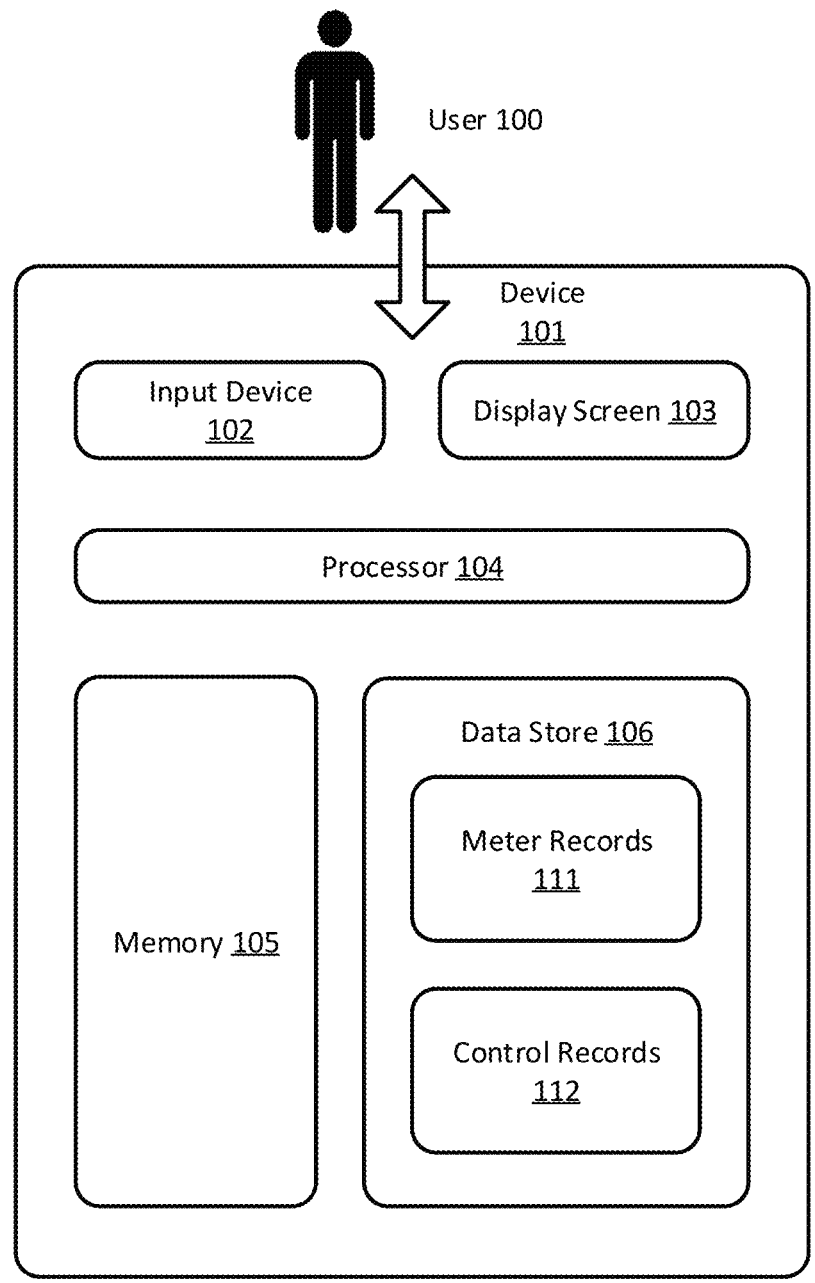
FIG. 1A is a block diagram depicting a hardware architecture according to one embodiment.
Figure 1B:
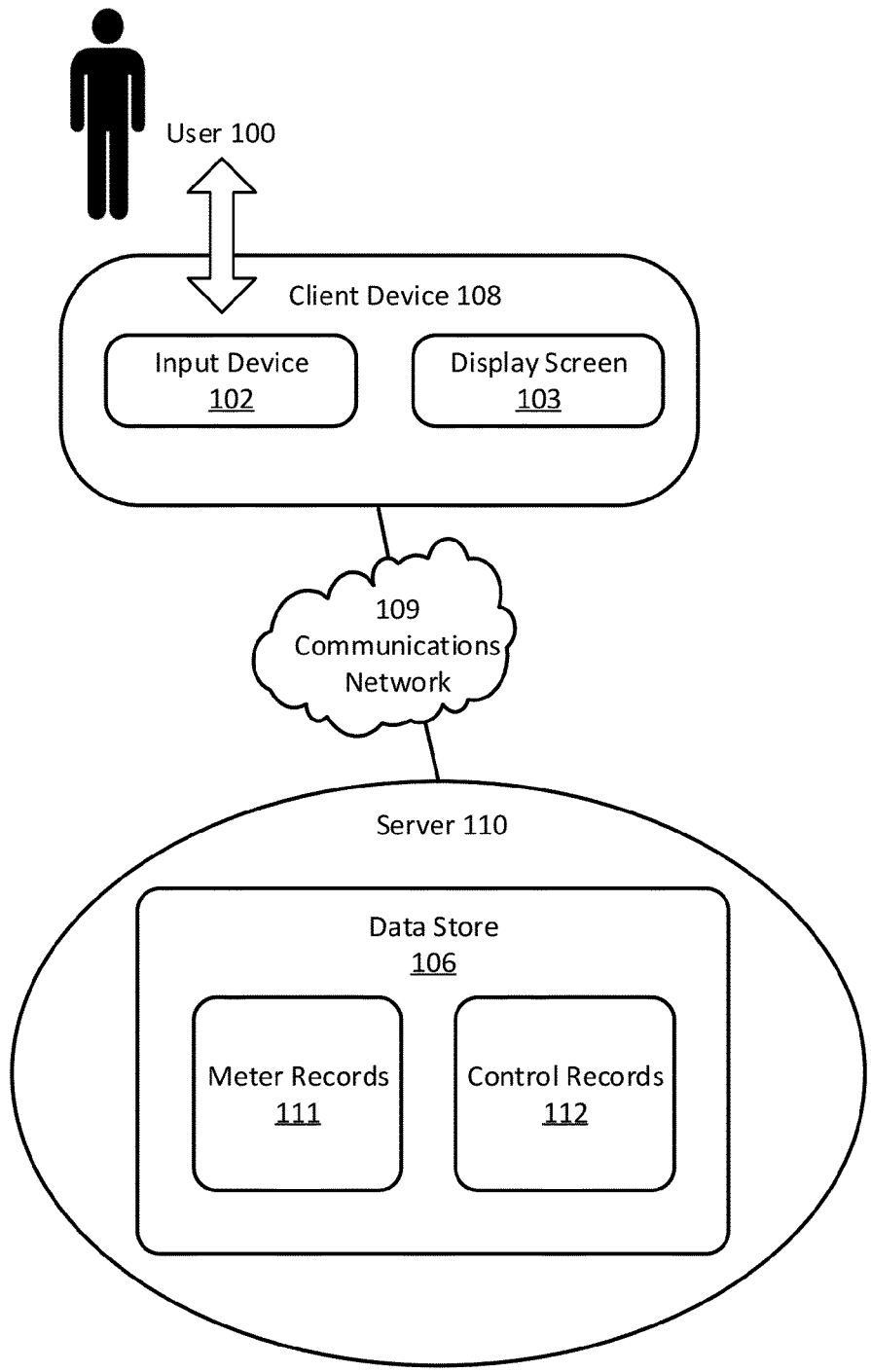
FIG. 1B is a block diagram depicting a hardware architecture in a client/server environment, according to one embodiment.

In some embodiments, one or more devices 101 and/or client devices 108, as shown and described in FIGS. 1A and 1B, may be used to implement such a system and method. Thus, in the figures and descriptions below, it will be understood that any of the components and/or method steps shown or described may be implemented in one or more of the devices 101 and/or client devices 108. Further, the functions and/or method steps set forth below may be carried out by software running on the one or more of the devices 101 and/or client devices 108. This software may optionally be multi-function software that is used to receive data regarding one or more facilities, facilitate analysis of such data, and/or implement control of facility functions. As indicated previously, this software will be referred to as "BuildingOS."

In this application, a "facility" refers to any building or other structure that utilizes a service or feature that can beneficially be monitored and/or controlled. A "data source" is a device that provides data. A "meter" is any device that is a data source and/or can be controlled to modify provision of a service to a facility. A "meter reading" is any portion of data provided by a meter. A "processed meter reading" is a meter reading that has been modified and/or checked for accuracy. A "data visualization" is a chart, graph, or other visual representation of a data set. A step that is performed "automatically" is a step that is carried out without requiring user input (beyond that provided prior to initiation of the step that is performed "automatically").

The system and method of the present disclosure may be used in conjunction with a wide range of services and a wide range of data sources. Such data sources may include, but are not limited to, the following:

Building automation systems
Building controls systems;
Building management systems;
Energy management systems;
Energy information systems;
Energy accounting systems;
Portfolio management or accounting systems;
Meters and sub-meters for utilities;
Programmable Logic Controllers;
System/Network controllers;
Terminal Unit controllers
Smart meters;
Advanced Metering Infrastructure systems;
Gateway devices;
Wireless gateway devices;
Home Area Network devices;
Wireless bridge devices;
Data logging devices;
Thermostat controls;
Serial thermostat controls;
IP-enabled thermostat controls;
ZigBee-enabled thermostat controls;
Utility meter systems, such as for electric, gas, or water utilities;
Plug load monitoring and control devices;
Smart power strips;
Device controls;
Appliance controls;
Equipment controls;
Kitchen appliances such as refrigerators, ovens, drink dispensers, and hot water heaters;
Circuit-level controls;
Wireless current sensors;
Heating and cooling systems;
Ventilation systems;
Smart vents;
Rooftop unit controls;
Air handler controls;
VAV box controls;
Air conditioning controls;
Chilled water systems;
Condenser water systems;
Hot water systems;
Pump controls;
Air flow sensors;
Pressure sensors;
Water monitoring systems;

Plumbing systems;
Water filtering systems;
Wastewater treatment systems;
Depth sensors;
Display screen controls;
Television controls and/or electronics;
On-site generation systems;
Solar photovoltaic systems;
Inverters;
Solar thermal systems;
Geothermal systems;
Fan activation systems;
Motor activation systems;
Lighting automation and controls systems;
Lighting fixture and light bulb controls;
Demand response providers;
Demand management systems;
Peak demand management systems;
Bill management, processing, and payment systems;
Budgeting systems;
Elevator systems;
Mail delivery systems;
Security and access control systems;
Alarm controls;
Video monitoring systems;
Motion sensors;
Infrared sensors;
Photoelectric sensors;
Locks;
Fuel storage systems;
Battery storage systems;
Occupancy sensors;
Floor sensors;
Occupant comfort tracking systems;
Environmental sensors;
$CO_2$ sensors;
CO sensors;
Fire protection systems;
Smoke detectors;
Landscape sensors;
Weather monitoring systems;
Temperature sensors;
Humidity sensors;
Moisture sensors;
Precipitation sensors;
Wind speed and direction sensors;
Dynamic building envelope controls;
Window systems;
Blinds and shading systems;
Gearbox controls;
Foundation sensors;
Wall sensors;
Door sensors;
Doorbells;
Visitor entry systems;
Device status tracking systems;
Sound systems;
Speakers;
Intercoms;
Parking sensors;
Vehicle tracking systems;
Waste sensors;
Recycling sensors;
Fault detection systems;
Diagnostics systems;
Inventory tracking systems;
Asset tracking and tagging systems;
RFID tags;
Auditing and remote auditing systems;
Energy procurement systems;
Energy supply management systems;
Employee management systems;
Occupant engagement systems;
GHG inventory management systems;
Carbon accounting systems;
Carbon offsetting systems;
Automated carbon offsetting systems;
Server and data center controls;
Robotic systems;
Industrial automation systems;
Energy modeling and simulation systems;
Utility tariff and rate engine systems;
Distributed control systems;
Cloud and cloud-to-cloud systems;
Wireless smart and automation hubs;
Manual datasheet uploads; and
Manual data point entry.

BuildingOS may be able to receive and process data from any data source. In some embodiments, BuildingOS may have features that streamline connection with and/or use of data from data sources that adhere to certain vendor formats, standards, and/or protocols. Specifically, BuildingOS may have features designed to facilitate use with data sources from companies and/or standards that include, but are not limited to, the following:
 Alerton;
 Andover Controls;
 Automated Logic;
 Constellation VirtuWatt;
 Delta Controls;
 EnerNOC;
 Honeywell;
 Echelon iLon;
 JCI Metasys;
 JCI Panoptix;
 oBIX;
 Schneider Electric;
 Siemens;
 Trane;
 Tridium;
 Duke Energy;
 EnergyCAP;
 Energy Star Portfolio Manager;
 Green Button;
 Green Button Connect;
 Manual Bill Entry;
 Manual Meter Entry;
 PG&E InterAct Consumption;
 PG&E InterAct Trend;
 Philips;
 Rainforest Automation;
 SchoolDude;
 SDG&E Green Button Connect;
 SmartMeter Texas;
 Urjanet;
 WegoWise;
 38 Zeros;
 Accuenergy;
 Bloom Energy;
 DGLogik;
 eGauge Systems;
 E-Mon D-Mon;
 Enmetric Systems;
 Enphase Energy;

InStep;
Lutron
Modbus;
Obvius;
Onset;
Organic Response;
Panoramic Power;
Philips;
Power-One;
PowerWise Systems;
Pulse Output Meters;
SMA;
Square D;
Sunverge Energy;
Veris;
WattNode;
Z3 Controls;
CSV;
REST/JSON; and
XML-RPC.

System Architecture

According to various embodiments, the system can be implemented on any one or more electronic devices equipped to receive, store, and present information. Such an electronic device may be, for example, a desktop computer, laptop computer, smartphone, tablet computer, smartphone/tablet ("phablet"), wearable computer, or the like.

Although the system is described herein in connection with an implementation in a desktop computer, one skilled in the art will recognize that the techniques described herein can be implemented in other contexts, and indeed in any suitable device. Accordingly, the following description is intended to illustrate various embodiments by way of example, rather than to limit scope.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device equipped to provide visual output.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and retrieved by device 101 when needed for presentation to user 100. Data store 106 may store one or more data sets, which may be used for a variety of purposes and may include a wide variety of files, metadata, and/or other data. In at least one embodiment, data store 106 may include meter records 111, control records 112, and/or other data.

Display screen 103 can be any element that graphically displays information such as items from data store 106 and/or the results of steps performed on such items to provide information useful to a user. Such output may include, for example, images, facility maps or diagrams, charts, graphs, menus, navigational elements, queries requesting information or selections from the user, and/or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, data store 106 is organized in a file system. Appropriate indexing can be provided to associate data elements with each other. Data store 106 may include any of a wide variety of data structures known in the information storage arts, such as databases and other suitable data storage structures. As in FIG. 1A, data store 106 may include one or more data sets, which may include meter records 111, control records, and/or other data (not shown).

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106, reports, and/or other data derived from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), 557, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106. Server 110 may include additional components as needed for retrieving data from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, data store 106 is organized in a file system. Appropriate indexing can be provided to associate data elements with each other. Data store 106 may include any of a wide variety of data structures known in the information storage arts, such as databases and other suitable data storage structures. As in FIG. 1A, data store 106 may include one or more data sets, which may include meter records 111, control records 112, and/or other data (not shown).

Display screen 103 can be any element that graphically displays information such as items from data store 106 and/or the results of steps performed on such items to provide information useful to a user. Such output may include, for example, images, facility maps or diagrams, charts, graphs, menus, navigational elements, queries requesting information or selections from the user, and/or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, some or all of the system can be implemented as software written in any suitable computer programming language, whether in a standalone or client/server architecture. Alternatively, it may be implemented and/or embedded in hardware.

Data Structures

In general, the data stored within data store 106 of FIG. 1A or FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer. As mentioned previously, data store 106 may include meter records 111, control records 112, and/or other data (not shown).

Figure 2A:
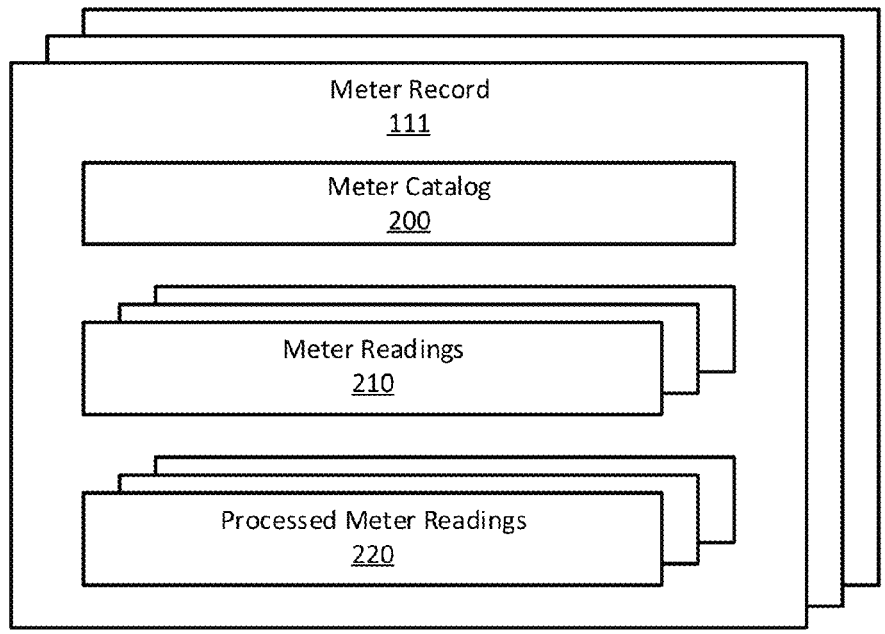
FIG. 2A is a block diagram depicting one of the meter records of FIGS. 1A and 1B.

Referring to FIG. 2A, a block diagram depicts one of the meter records 111 of FIGS. 1A and 1B, which is shown by way of example according to one embodiment. Each of the meter records 111 may pertain to a particular data source, or meter, that provides data regarding provision of at least one service to the one or more facilities. As shown, each of the meter records 111 may have a meter catalog 200, meter readings 210, and processed meter readings 220.

The meter catalog 200 may be an identifier of a meter. A meter catalog 200 may be unique to the meter to which it pertains, and may enable the user 100 to discover the meters from the source system. The meter catalog 200 may also be used to assign the meter to a logical location within the one or more facilities. The one or more facilities, together, may constitute a "building portfolio" representing facilities monitored and/or controlled by the user 100.

The meter readings 210 may include data captured by the meter to which the meter catalog 200 pertains. The meter readings 210 may allow a meter, and thus the vendor providing the service to which the meter pertains, to report data in its own native format as it relates to the native device ID of the meter. The vendor's system may report all data that is available. Thus, the meter readings 210 may not necessarily be in a format that is consistent with other meter readings 210 received from other meters, and may not necessarily be in a format that is readily conducive to analysis by the user 100. Further, the meter readings 210 may include some inaccurate data that may misrepresent the item(s) to be measured. Hence, it may be desirable to process the meter readings 210.

The processed meter readings 220 may be generated as the meter readings 210 are processed, either in real-time or at established intervals. The meter readings 210 may be normalized, scaled, filtered, extrapolated, averaged, curve fitted, and/or otherwise processed to provide a content and/or format suitable for the user 100. The processed meter readings 220 may be used by the user 100 for analysis and/or by the system to trigger actions such as notifications or control commands.

In at least one embodiment, the meter catalogs 200, meter readings 210, and/or the processed meter readings 220 leverage push-and-pull discovery and reporting in a variety of formats using a variety of transport protocols. Examples of formats include, but are not limited to:
 JSON
 CSV
 XML
 XMLRPC (Function call)
Examples of transport protocols include, but are not limited to:
 Generic HTTP(S) post
 Generic HTTP(S) get
 REST'ful Web Service
 SOAP Web Service
 (s)FTP SMTP (Simple Mail Transport Protocol; Email)

The meter readings 210 and the processed meter readings 220 may both include data recorded over time. The meter readings 210 may be recorded in real-time and/or at established intervals (for example, every second, minute, hour, day, or week). The processed meter readings 220 may be generated in real-time as the meter readings 210 are received, or may be generated at established intervals. If desired, the meter readings 210 and the processed meter readings 220 may both include a limited window of time (for example, the most recent three months or the like). Thus, older data of the meter readings 210 and the processed meter readings 220 may be deleted and/or archived as new data is received. Alternatively, the meter readings 210 and the processed meter readings 220 may be retained indefinitely, or until the user 100 determines that some portion of the data of the meter readings 210 and the processed meter readings 220 is to be deleted and/or archived.

Figure 2B:
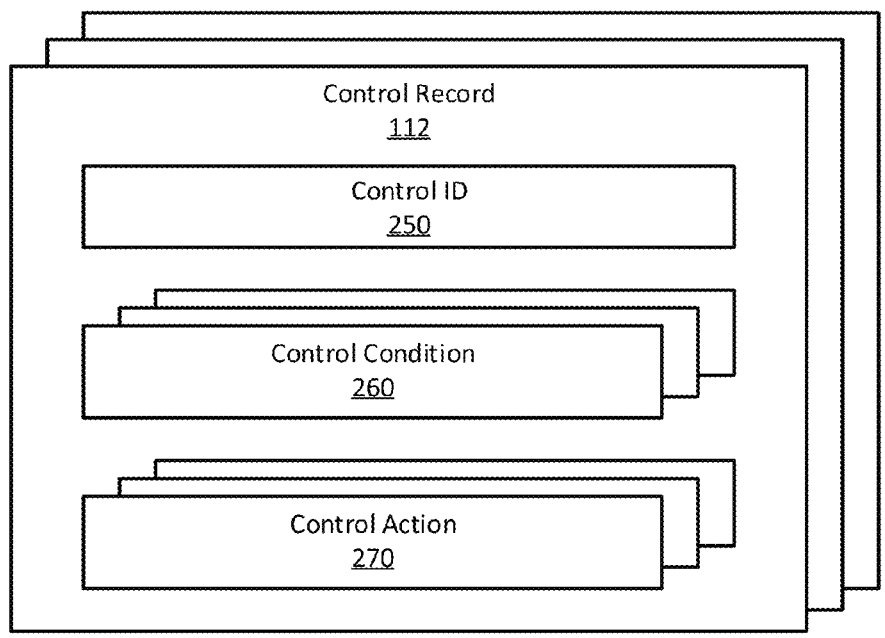
FIG. 2B is a block diagram depicting one of the control records of FIGS. 1A and 1B.

Referring to FIG. 2B, a block diagram depicts one of the control records 112 of FIGS. 1A and 1B, which is shown by way of example according to one embodiment. Each of the control records 112 may pertain to a particular control operation that the user 100 desires to be undertaken relative to the one or more facilities. As shown, each of the control records 112 may have a control ID 250, one or more control conditions 260, and one or more control actions 270.

The control ID 250 may be a unique identifier for the particular control to which the control record 112 pertains. The control ID 250 may be a name or other descriptor recognizable to the user 100. Alternatively, the control ID 250 may be a record number or other identifier that is not designed to be shown to or understood by the user 100.

Each of the one or more control conditions 260 may be a condition that must be satisfied in order to trigger the one or more control actions 270. Satisfaction of the control conditions 260 may be determined by comparing the control conditions 260 with the processed meter readings 220.

Each of the control actions 270 may be an action that is to be undertaken when the control conditions 260 are met. The control actions 270 may include changing an attribute of some portion of the one or more facilities. For example, control actions 270 may include, but are not limited to, turning a furnace or air conditioner on or off, opening or closing ventilation ducting, changing the luminance level of a lighting system, or the like. Additionally or alternatively, the control actions 270 may include communications functions, such as transmitting a notification to the user 100. Such notifications may be transmitted to the user 100 who sets the control action 270 and/or to other users. If more than one of the control actions 270 are present for a control record 112, all of the control actions 270 may be automatically initiated by the system in response to satisfaction of the control conditions 260.

The control conditions 260 may be structured using various Boolean operators, such as AND, OR, NOT, AND-NOT, and the like. For example, the control conditions 260 may include activating an air conditioner if the temperature in a building exceeds 80° AND the humidity in the building exceeds 20%, OR if the temperature in the building exceeds 76° AND the humidity in the building exceeds 50%. Various examples of the control conditions 260 will be shown and described in detail subsequently.

FIGS. 2A and 2B are merely exemplary. Those of skill in the art will recognize that records and other data structures referenced in the present disclosure may include various data different from or in addition to that illustrated in FIGS. 2A and 2B.

BuildingOS Functional Architecture

Figure 3:
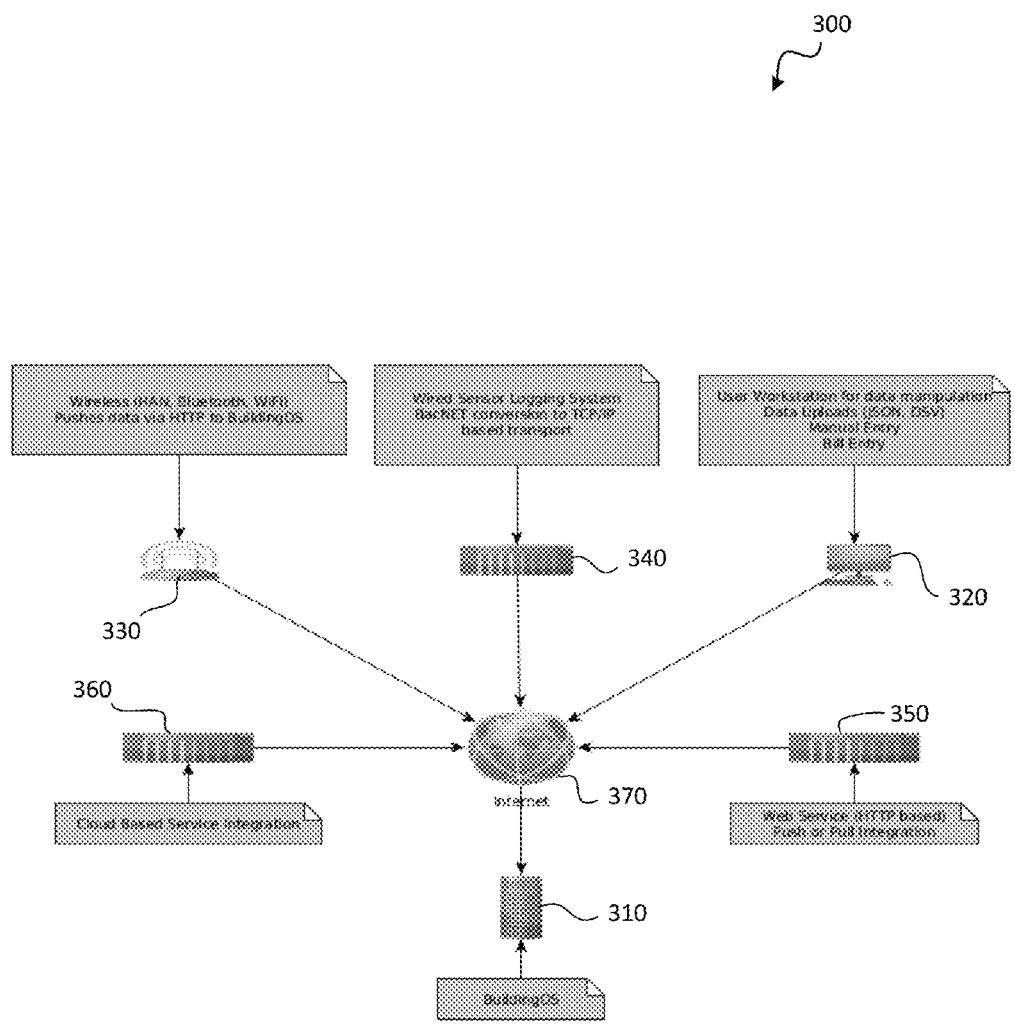
FIG. 3 is a schematic block diagram depicting a system for monitoring and/or controlling one or more facilities, according to one embodiment.

Referring to FIG. 3, a schematic block diagram illustrates a system 300 according to one embodiment. As shown, the system 300 may include a server 310, a workstation 320, a wireless data transmission system 330, a wired sensor logging system 340, a web service 350, and a cloud based service integration system 360. These various components may communicate with each other via various networks, including but not limited to a local area network (LAN), a wide area network (WAN), a cellular network, and/or the Internet 370.

BuildingOS may run on the server 310, and may be accessed and/or used by the user 100 via the workstation 320. The server 310 may be an example of a server 110, and the workstation 320 may be an example of a client device 108, as shown and described in connection with FIG. 1B. The wireless data transmission system 330 and the wired sensor logging system 340 may transmit data to the server 310 and/or the workstation 320 from various meters and/or other devices used in conjunction with the one or more facilities to be operated with BuildingOS. Communications between these various components may be facilitated through the use of the web service 350 and/or the cloud based service integration system 360.

BuildingOS may integrate seamlessly with data systems through TCP/IP (Transmission Control Protocol/Internet Protocol) based protocols and/or any other suitable protocol(s). Virtually any system capable of reporting time-series data may also be capable of transmitting data to BuildingOS for ingestion into the system 300. FIG. 3 depicts an overall functional architecture for the BuildingOS operating system, and illustrates some systems that can be integrated with BuildingOS. This normalization may allow a completely homogeneous integration of disparate energy, resource, occupancy, and other data that can be easily assimilated and aggregated using ConnectNow technology, as will be shown and described in connection with FIG. 4.

ConnectNow Functional Architecture

Figure 4:
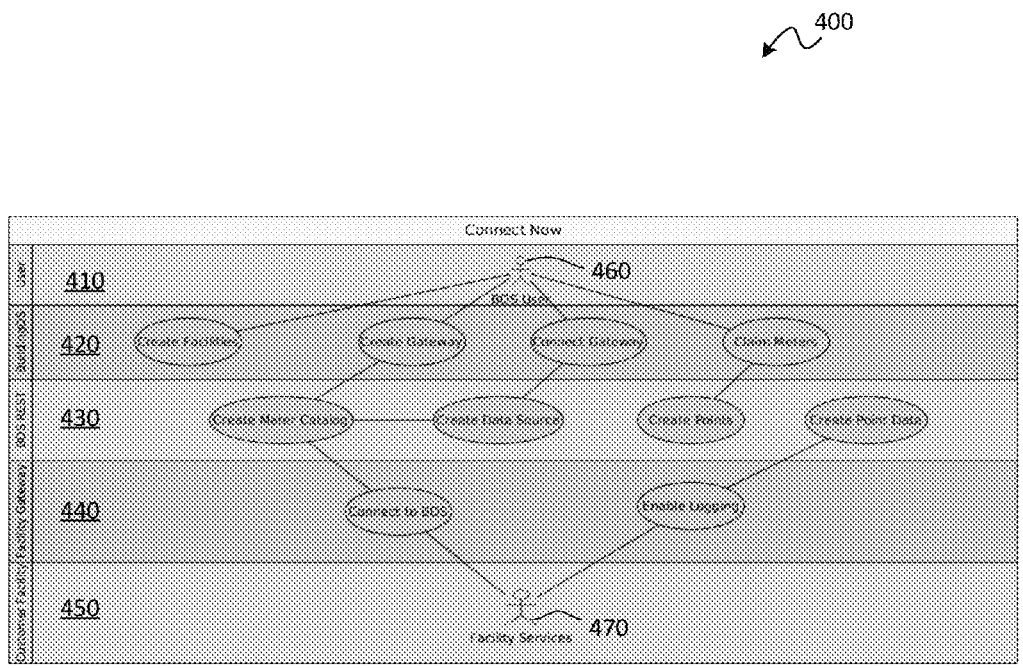
FIG. 4 is a schematic block diagram depicting one manner in which meters may be connected, according to one embodiment.

Referring to FIG. 4, a schematic block diagram 400 illustrates one manner in which the ConnectNow module of BuildingOS may connect to meters, according to one embodiment. Communications are shown between different levels, such as a user level 410, a BuildingOS level 420, a BuildingOS REST level 430, a facility gateway level 440, and a customer facility level 450.

In at least one embodiment, ConnectNow operates in a manner similar to common driver management for connecting common desktop computer operating systems to printers and network devices, but in a BuildingOS context. In FIG. 4, there are two users: a BuildingOS user, or BOS user 460, and a facility services user 470 such as an engineer. In previously known solutions, connectivity to an external system was performed in a manner specific to the chosen system, or done by leveraging an expensive professional services engagement led by the facility services user 470. BuildingOS and ConnectNow may enable non-technical users (such as the BOS user 460) to communicate significant metadata like facilities and gateways through a simple wizard interface.

This functionality may open up the ability for external systems to safely and securely communicate discovery data in the form of a catalog of meters which creates the necessary infrastructure and which creates a BuildingOS-specific data source instance. A data source such as a meter may manage all acquired data points. Acquired data may be data originating from the source system. Such automation may enable the facility services personnel, such as the BOS user 460, to simply point, connect, or enable logging communication with BuildingOS.

Data Source Architecture

Figure 5:
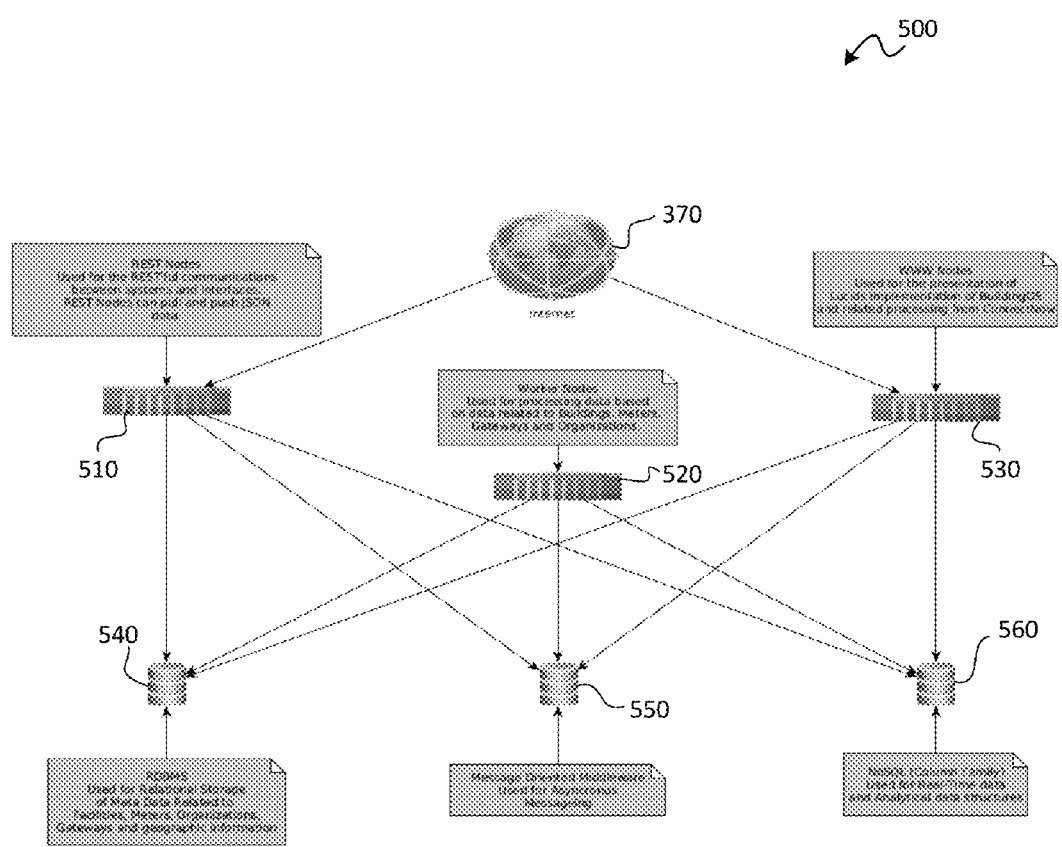
FIG. 5 is a schematic block diagram depicting how data may move between various optional components of the system of FIG. 3.

Referring to FIG. 5, a schematic block diagram 500 illustrates how data may move between various components, which may be optional components of the system 300. For example, the schematic block diagram 500 illustrates REST nodes 510, worker nodes 520, WWW nodes 530, a RDBMS component 540, a message oriented middleware component 550, and a NoSQL component 560. These components may communicate with each other and/or the server 310 via any suitable network, such as a local area network (LAN), wide area network (WAN), cellular network, and/or the Internet 370.

Once connected to the BuildingOS system, a source system may simply push messages that are in the original format of the source system. Additionally or alternatively, pulling of such messages may be enabled. Source data that is pushed or pulled may be received in the system 300 via a common interface within the REST nodes 510. In at least one embodiment, the system 300 may leverage a messaging queue in a fashion similar to an event queue for a common computer operating system. The data may be processed, for example, within the Worker nodes 520. Processing may include, for example, transforming the data, extracting readings, and/or aggregating the readings into multiple time resolutions. The WWW nodes 530 may be responsible for presenting the data to external systems.

Figure 6:
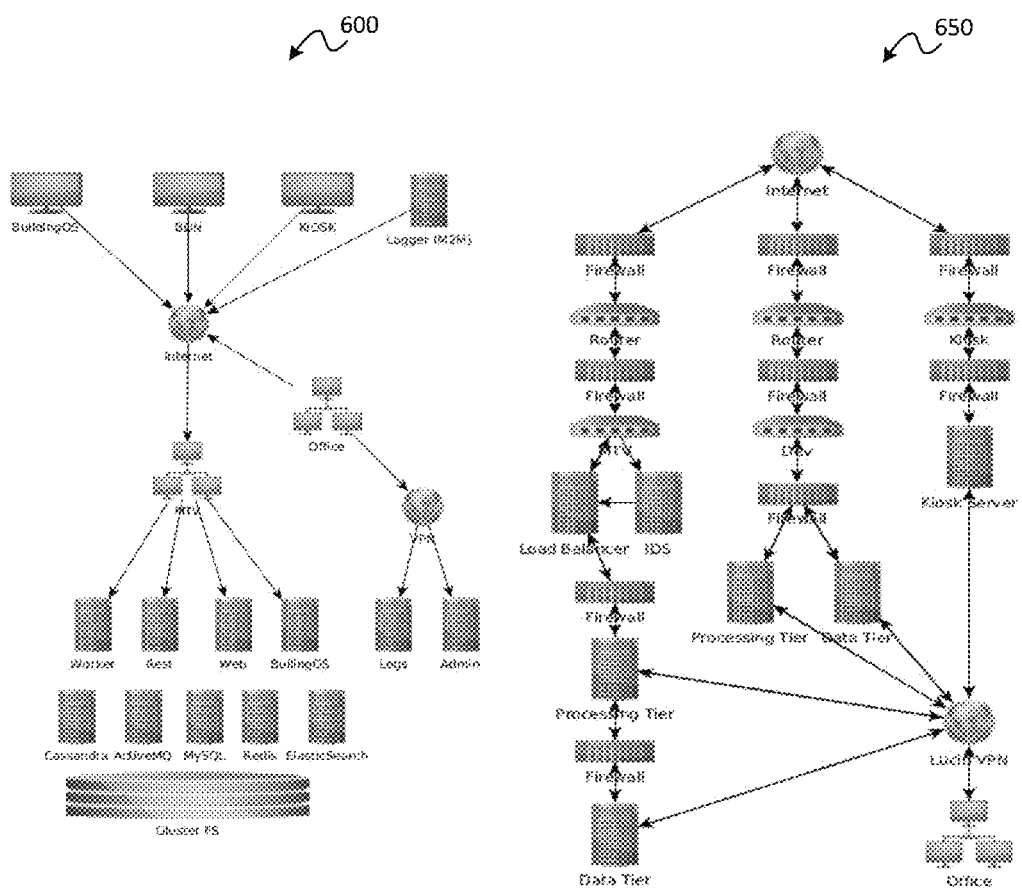
FIGS. 6A and 6B are schematic block diagrams depicting optional production and network architectures, respectively, according to one embodiment.

Referring to FIGS. 6A and 6B, schematic block diagrams 600 and 650, respectively, are shown. The schematic block diagrams 600 and 650 illustrate optional production and network architectures, respectively, which may be applicable to the operation of the system 300.

Facility Monitoring and Control

Figure 7:
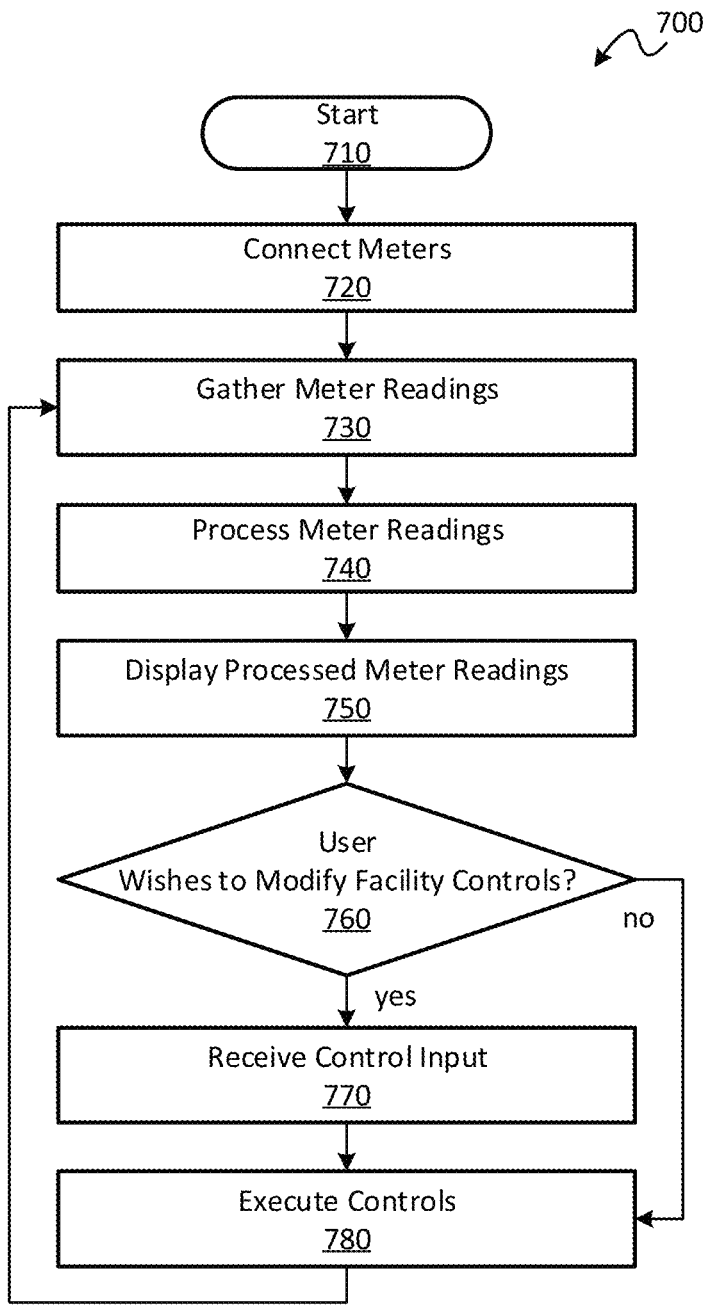
FIG. 7 is a flowchart diagram depicting a method of monitoring and/or controlling one or more facilities, according to one embodiment.

Referring to FIG. 7, a flowchart diagram illustrates a method 700 of monitoring and/or controlling one or more facilities, according to one embodiment. The method 700 may be carried out through the use of a system such as the system 300 of FIG. 3, as will be described by way of example below. Additionally or alternatively, other systems may be used to carry out the method 700. Further, a system such as the system 300 of FIG. 3 may be used to carry out other methods besides the method 700 of FIG. 7.

As shown, the method 700 may start 710 with a step 720 in which one or more data sources, for example, meters, are connected to the system 300. In a step 730, meter readings 210 may be gathered from the meters connected in the step 720. In a step 740, the meter readings 210 may be processed to generate processed meter readings 220. In a step 750, the processed meter readings 220 may be displayed for the user 100, for example, by displaying the processed meter readings 220 on the display screen 103 of the device 101 and/or the client device 108.

In a query 760, a determination may be made as to whether the user 100 wishes to modify any of the controls in place for the one or more facilities. If the user 100 does wish to modify the controls, the method 700 may proceed to a step 770, in which user input may be received from the user 100 to establish and/or modify one or more controls for the one or more facilities. This may result in the creation and/or modification of one or more of the control records 112 shown in FIG. 2B. If the user 100 does not wish to modify the controls, the method 700 may skip the step 770 and proceed directly to the step 780.

In the step 780, the controls may be executed. This may be done, for example, by comparing the control conditions 260 of each of the control records 112 with the processed meter readings 220 generated in the step 740. For any of the control records 112 for which the control conditions 260 are satisfied, the control actions 270 may be taken. As indicated previously, execution of the control actions 270 may involve adjustment of attributes of components in or services to the one or more facilities to be monitored and/or controlled. Alternatively or additionally, execution of the control actions 270 may involve transmission of one or more notifications to one or more individuals involved with the one or more facilities, which may optionally include the user 100 who provided user input establishing the control.

The method 700 may return to the step 730, in which the meter readings 210 continue to be gathered. The remaining steps may be repeated for as long as it is desirable to undertake monitoring and/or control of the one or more facilities.

The method 700 is merely exemplary; those of skill in the art will recognize that other methods may be used within the scope of the present disclosure. Examples of various steps of the method 700 will be shown and described in greater detail in connection with FIGS. 8, 9, and 10, as follows.

Data Source Connection

Figure 8:
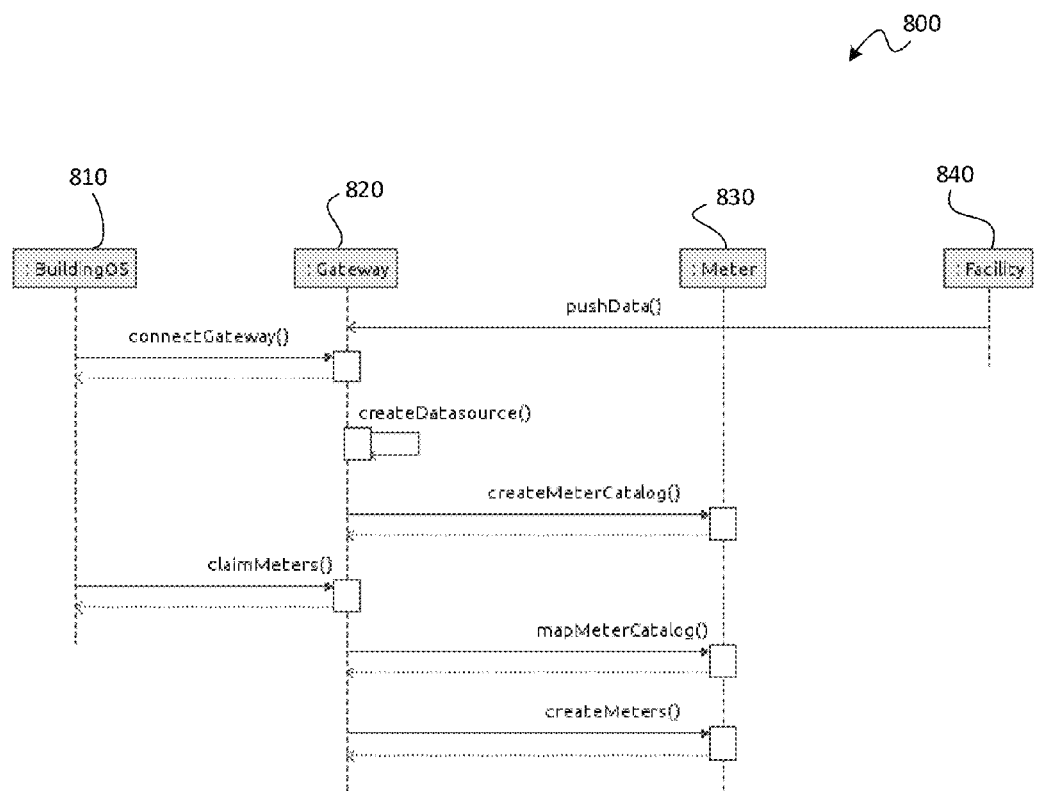
FIG. 8 is a process flow diagram depicting one way in which the connecting meters step of the method of FIG. 7 may be performed.

Referring to FIG. 8, a process flow diagram 800 illustrates one way in which the step 720 of the method 700 of FIG. 7 may be performed. The process flow diagram 800 illustrates one manner in which various functions of the ConnectNow module of BuildingOS may function to connect BuildingOS to data sources such as meters. More particularly, information flow is shown between nodes including BuildingOS 810, a gateway 820, a meter 830, and a facility 840, which may be a facility that is to be monitored and/or controlled.

As shown in FIG. 8, the two primary actors involved in the ConnectNow process may be BuildingOS 810 and the facility 840. The facility 840 may push data asynchronously to the gateway 820 for BuildingOS 810 without any further setup or installation. When a user of BuildingOS 810 (for example, the user 100) wishes to enable data collection and processing for the system 300 at the facility 840, they may use "ConnectNow" technology. In at least one embodiment, this may entail performance of the following steps and/or software processes (shown in parentheses).

The gateway 820 may be connected to BuildingOS 810 (connectGateway( )). When the gateway 820 is connected, BuildingOS 810 may create a data source (createDatasource( )). The data source may contain the specific mapping and/or processing information for the gateway 820 that was created. Upon the next push of data from the facility 840, BuildingOS 810 "ConnectNow" may create a meter catalog 200 (createMeterCatalog( )) for the meter 830. The meter catalog 200 may be a specific listing of the source system's meters and/or sensors that are included in the meter 830. When data is pushed from the facility 840, it may also contain specific mapping information that is used by BuildingOS 810 when extracting readings from the meter readings 210 from the meter 830.

Next, the meters (such as the meter 830) may be claimed (claimMeters( )). When meters are claimed by a user 100 of BuildingOS 810, full end-to-end processing may be enabled. Claiming the meter 830 may cause BuildingOS 810 to map the attributes of the meter catalog 200 of the meter 830 to a virtual representation of the facility 840 for a given organization. This process (mapMeterCatalog( )) may use geolocation processing to enable the use of time zone information that may facilitate management of multiple facilities, particularly where such facilities are located across multiple time zones. Once the mapping is complete, corresponding meters may be created (createMeters( )) in BuildingOS 810. Meters created within BuildingOS 810 may be called "acquired points." This distinction may indicate that the acquired point is from the facility.

A user 100 of BuildingOS 810 may also be able to claim virtual meters in the same fashion they had previously claimed the acquired point type meters above. A virtual meter, called a "derived point" within the BuildingOS system, may be a meter whose readings are derived from readings of other meters (acquired points or derived points). These meters and their readings may enable the association of meter readings 210 to create holistic views of any type of resource consumption or generation strategy for the facility 840.

Data Gathering

Figure 9:
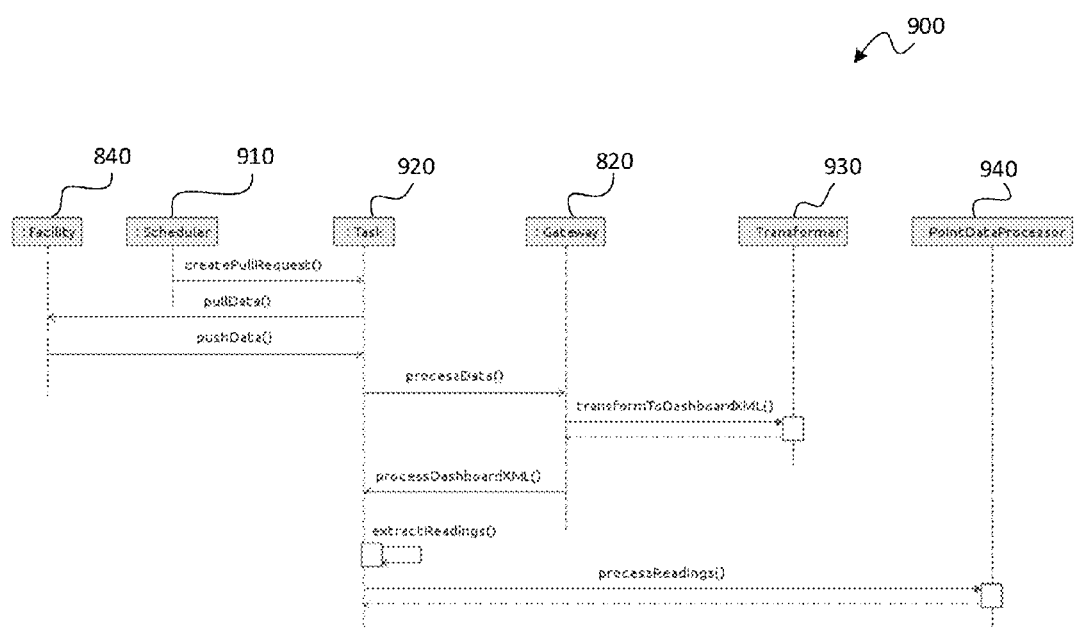
FIG. 9 is a process flow diagram depicting one way in which the gather meter readings step of the method of FIG. 7 may be performed.

Referring to FIG. 9, a process flow diagram 900 illustrates one way in which the step 730 of the method 700 of FIG. 7 may be performed. The process flow diagram 900 illustrates one manner in which BuildingOS may gather data such as the meter readings 210 from sources such as meters. More particularly, information flow is shown between nodes including the facility 840, a scheduler 910, a task module 920, the gateway 820, a transformer 930, and a point data processor 940.

Once the meter 830 has been connected to BuildingOS 810 and mapped, the system 300 may be capable of processing data from the meter 830. Accordingly, data regarding the facility 840, which may have been sent asynchronously during the operation of ConnectNow, may be gathered and stored. This is detailed in FIG. 9 and in the description below, which depicts the processes for acquiring the data, such as the meter readings 210, from the facility 840 and processing it in preparation for storage.

In particular, the asynchronous messages pullData( ) and pushData( ) may encapsulate the actual protocols used to access the data. This may be specific to the data source which was created above by the gateway 820. Once the data has been accessed in its native form, it may be sent asynchronously to the gateway 820 for processing (processData( ). The first step in gathering and storing data from the facility 840 may transform the data from its native state into dashboard.xml. This process of normalization (transformToDashboardXML( )) to dashboard.xml may enable BuildingOS 810 to define which data are to be extracted.

The next step may be evaluation of the consistency of the data for each specific data source (processDashboardXML( )). This process may validate data values, timestamps, and/or meter names against the gateway 820 and/or other gateways for BuildingOS 810. The validation may include evaluation of meter readings 210 to:

Ensure that the meter readings 210 are, in fact, readings and not random text;

Ensure that the meter readings 210 are decimal values or error messages;

Log any possible error messages;

Evaluate timestamps for correctness and relevance to the location and time zone from where they came; and/or Ensure that the meters that were created in BuildingOS 810 actually exist in the data set.

Once these steps have been carried out, the meter readings 210 may be partially processed. Once basic validation is completed, the readings may be further processed, as will be shown and described in connection with FIG. 10 (processReadings( )).

Data Processing

Figure 10:
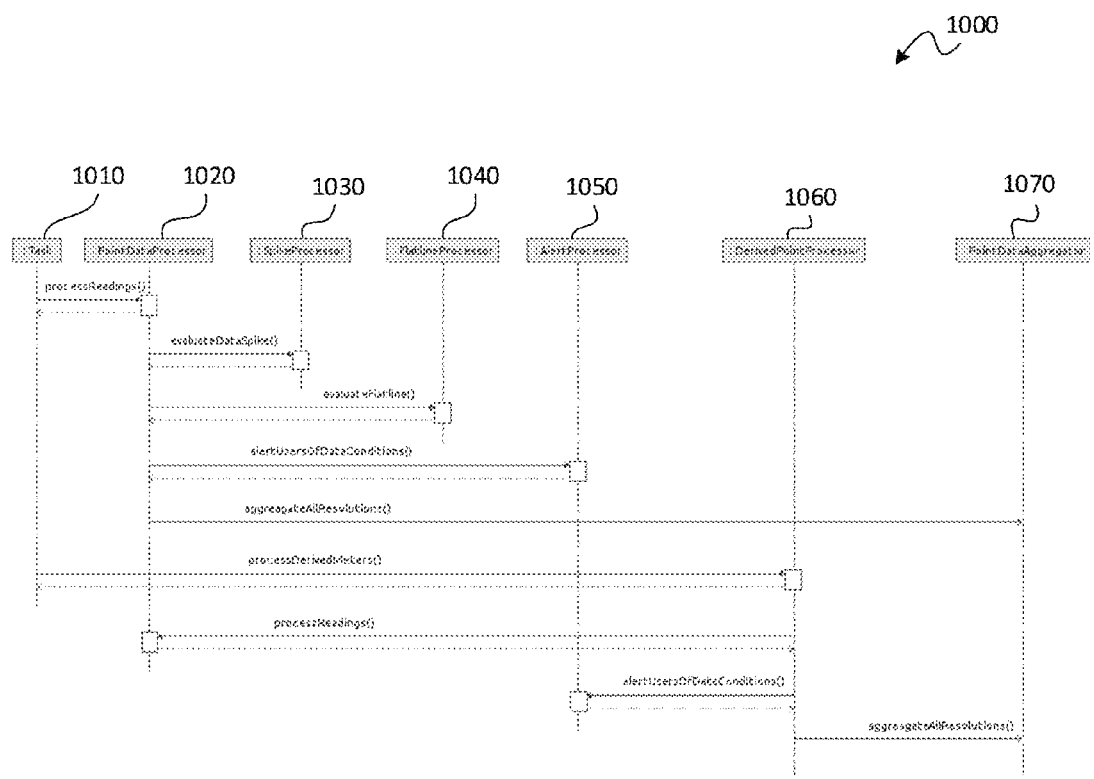
FIG. 10 is a process flow diagram depicting one way in which the process meter readings step of the method of FIG. 7 may be performed.

Referring to FIG. 10, a process flow diagram 1000 illustrates one way in which the step 740 of the method 700 of FIG. 7 may be performed. The process flow diagram 1000 illustrates one manner in which BuildingOS may process data such as the meter readings 210 to provide the processed meter readings 220. More particularly, information flow is shown between nodes including a task 1010, a point data processor 1020, a spike processor 1030, a flat line processor 1040, an alert processor 1050, a derived point processor 1060, and a point data aggregator 1070.

In at least one embodiment, the sequence of events necessary to ensure data is consistent and available is triggered by (processReadings( ). Once the data has been validated as described above, it may be processed. The first step in processing may be the synchronous event of evaluating data for an erroneous spike (evaluateDataSpike( )). It is quite common for data loggers and building management systems (BMS) to transmit readings where the value is out of the natural scope of reason for the type of energy or resources being monitored. This happens when the internal counters on the BMS or logger roll over or misread a given pulse. The occurrence of this event may be recorded within BuildingOS and thresholds related to the definition of "reason" for the natural scope can be adjusted through administrative controls within BuildingOS. Thus, data from the meter readings 210 that are erroneous or false can be flagged and/or filtered out for purposes of display to the user 100 and/or further processing.

The next step in processing may be to ensure that the meter reading 210 being processed is not a flatline (the same value repeated due to system failure) (evaluateFlatline( )). It is common for a system that has gone offline to repeat the last value recorded over and over. This is a subtle failure, but if not accounted for, it can yield false conclusions regarding the provision of the service to which the meter reading 210 pertains. When a system goes offline or flatlines, BuildingOS may notify users 100 of the event (alertUsersOfDataConditions( )) so that users can act on the malfunctioning system.

Once the meter reading 210 has cleared these synchronous processes, it may be written as a valid reading to the BuildingOS storage system. A weighted average value may be computed. The weighted average may be a decimal representation of the amount of time between the current reading and the reading immediately prior to it. This action may enable the consistent aggregation of meter readings 210 (aggregateAllResolutions( )) to different resolutions. It is common for a system to report data in inconsistent intervals. By using weighted averages, meter readings 210 can be determined at a quarter hour, hour, day, and month resolution that can be compared consistently and accurately to other series of data from the resolution for analysis.

The above process may also be applied to derived points. The processing of derived points (processDerivedMeters( )) may begin when the data for a meter has been successfully written and a dependent point needs a reading. The use of weighted averages here may allow for multiple systems to write at asynchronous intervals and for BuildingOS to record the reading for the derived point at the lowest resolution available.

The data source connection, data gathering, and data processing steps of FIGS. 8, 9, and 10, respectively, are merely exemplary. With the aid of this disclosure, those of skill in the art will recognize that these functions may be carried out in many ways different from those set forth explicitly herein.

EXAMPLES

The system 300 and method 700 set forth herein may be implemented in various user interfaces. Various examples will be shown and described in connection with FIGS. 11-34, as follows.

Data Source Connection

Figures 11A, 11B:
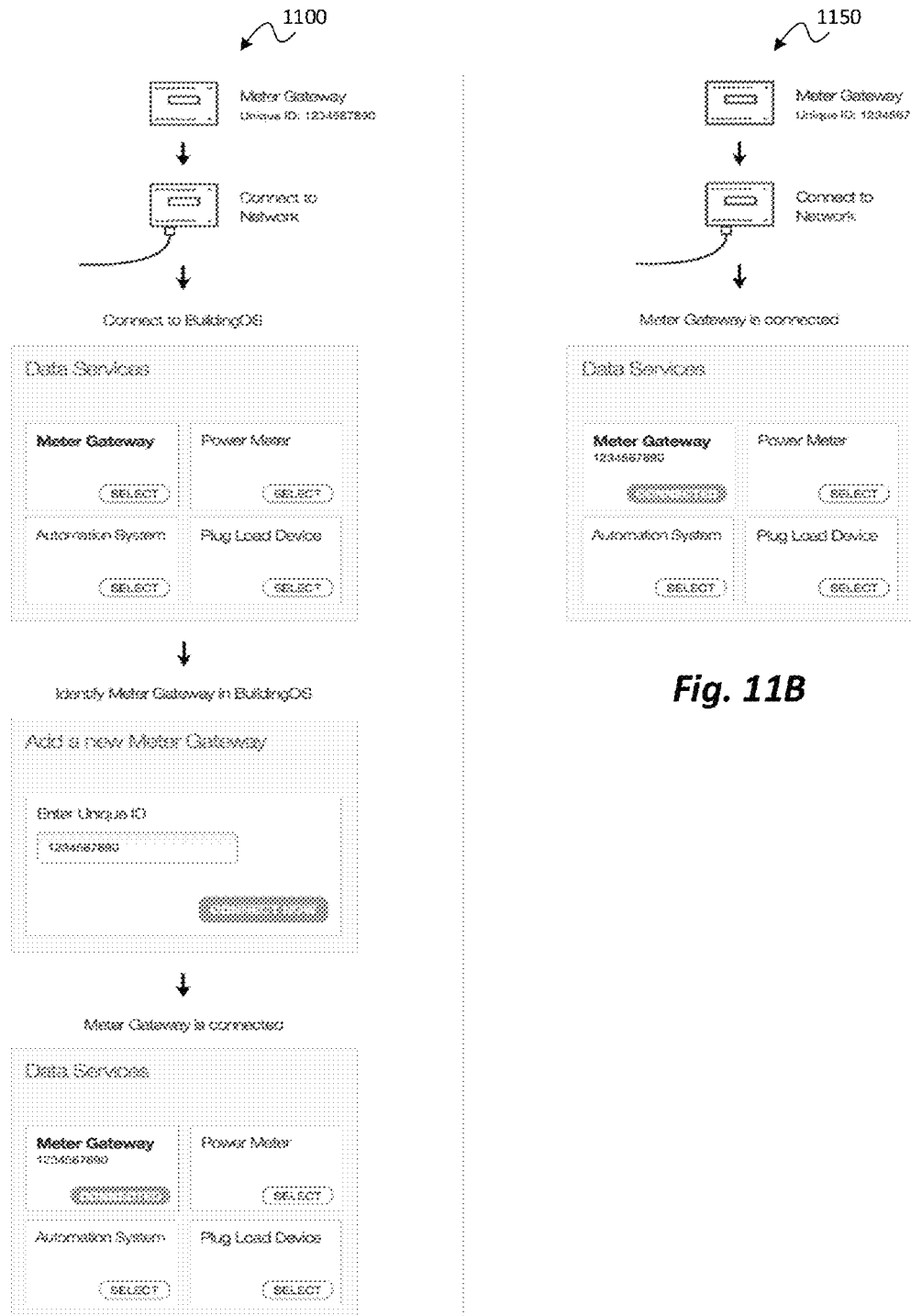
FIGS. 11A and 11B are screenshot diagrams depicting connection to new data sources.

Referring to FIGS. 11A and 11B, screenshot diagrams 1100 and 1150, respectively, illustrate connection of BuildingOS to new data sources. FIG. 11A illustrates connection via manual setup. FIG. 11B illustrates connection via auto-discovery.

In FIG. 11A, the user 100 may connect a wireless gateway device into the local network. In this example, the device communicates wirelessly with the facility's electricity meter. In BuildingOS, the user 100 may select the type of "Data Service" he or she wishes to add to BuildingOS. The user 100 may provide an identifying piece of information such as a MAC address of the device. The user 100 may then click "ConnectNow" to have BuildingOS automatically add the device to the list of connected Data Services. Data collection may now begin between the device and BuildingOS. In FIG. 11B, after the user 100 connects the device into the local network, the device is "auto-discovered" on the network by BuildingOS. Data collection may then begin automatically.

In addition to the connection methods shown and described in FIGS. 11A and 11B, there are other ways in which the user 100 may connect a device to BuildingOS. For example, the user 100 may scan a QR code, UPC symbol, other machine-readable code, or other identifier on the outside of the device. Additionally or alternatively, the user 100 may take a picture of the device, which may be automatically recognized and identified by BuildingOS. In other embodiments, radio frequency identification (RFID) and/or near-field communication (NFC) may be used to enable BuildingOS to identify the device.

Facility Control

Figure 12A:
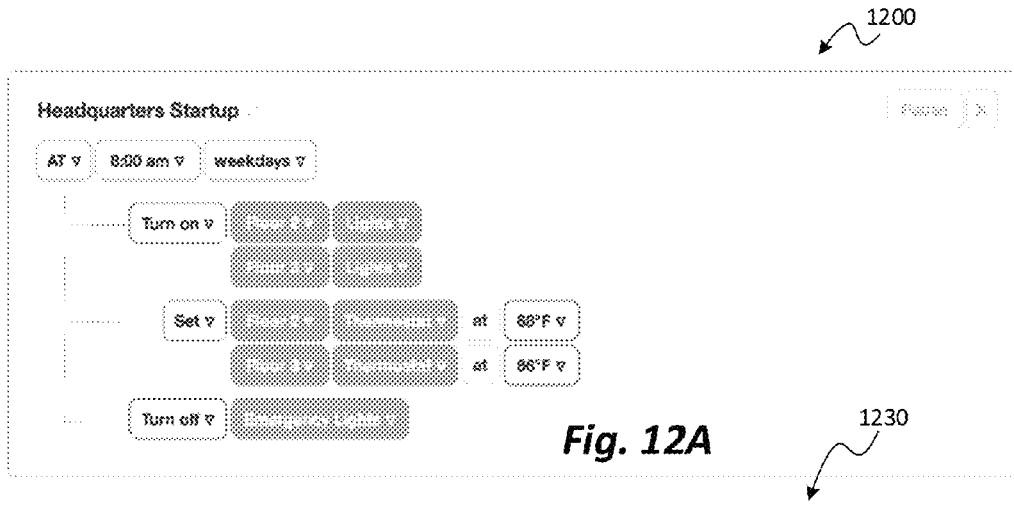
FIGS. 12A, 12B, and 12C are screenshot diagrams depicting various control sequences that may be used to control various aspects of the operation of one or more facilities.
Figure 12B:
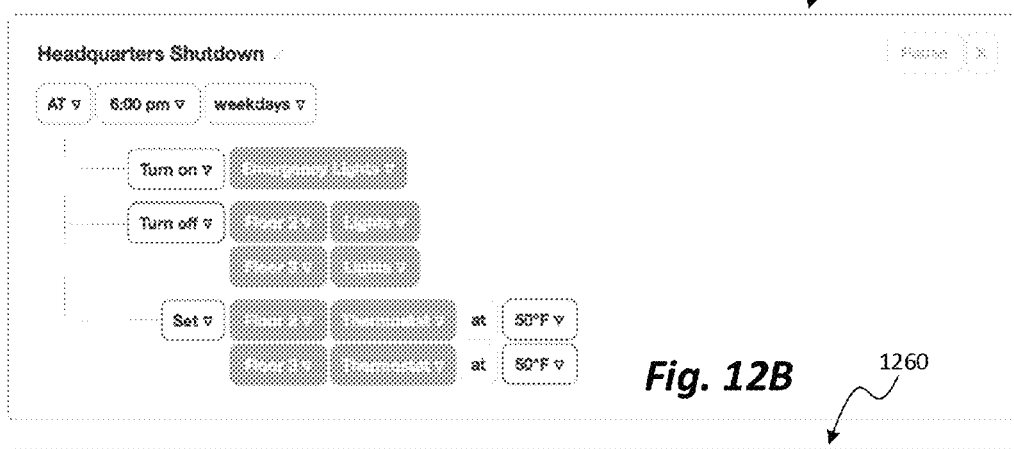
Figure 12C:
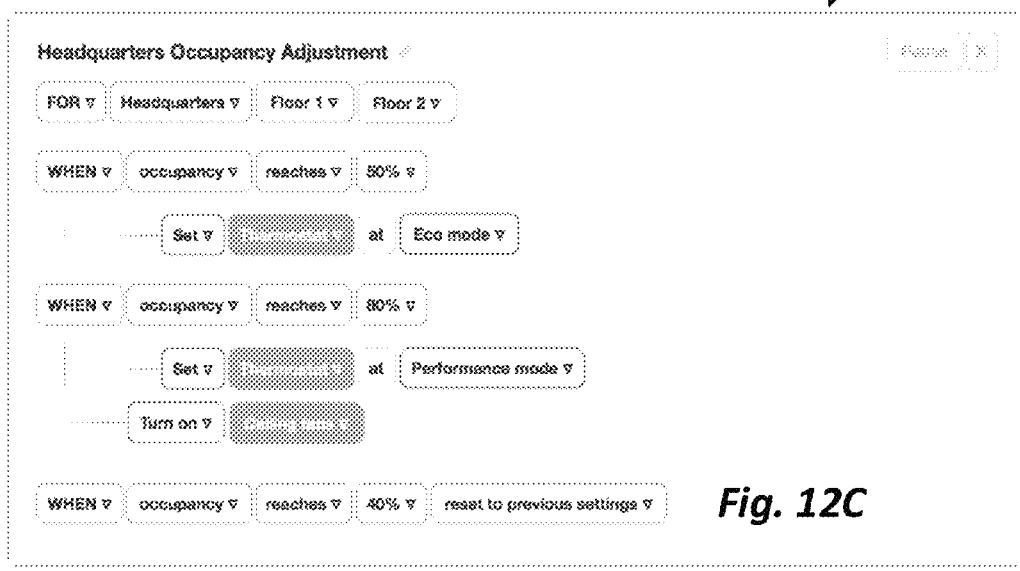

Referring to FIGS. 12A, 12B, and 12C, screenshot diagrams 1200, 1230, and 1260, respectively, illustrate various control sequences that may be used to control various aspects of the operation of one or more facilities through the use of BuildingOS. FIG. 12A illustrates a headquarters startup control sequence. FIG. 12B illustrates a headquarters shutdown sequence. FIG. 12C illustrates a headquarters occupancy adjustment sequence.

In FIGS. 12A and 12B, the user 100 may determine what happens to different systems and devices at different locations. At a specified time, these systems and devices may power on/off or, as in the case of a thermostat, receive an action or command to change their setpoint temperature. "Lights" refers to a group of monitored systems or devices that are used for lighting. Hence, the user 100 may specify a group of systems or devices to target for a given sequence or action. The phrase "68 degrees Fahrenheit" refers to an available setting that is exposed to BuildingOS via a connected data source (for example, the thermostat).

In FIG. 12C, the user 100 may first determine where a set of actions will be applied. Then, the user 100 may specify the actions to take place (i.e., control actions 270) at specified thresholds (i.e., control conditions 260). "Eco mode" and "Performance mode" refer to available settings exposed by the thermostat device as well as predefined settings that can be saved in BuildingOS for specifying and reusing in a sequence.

Figure 13:
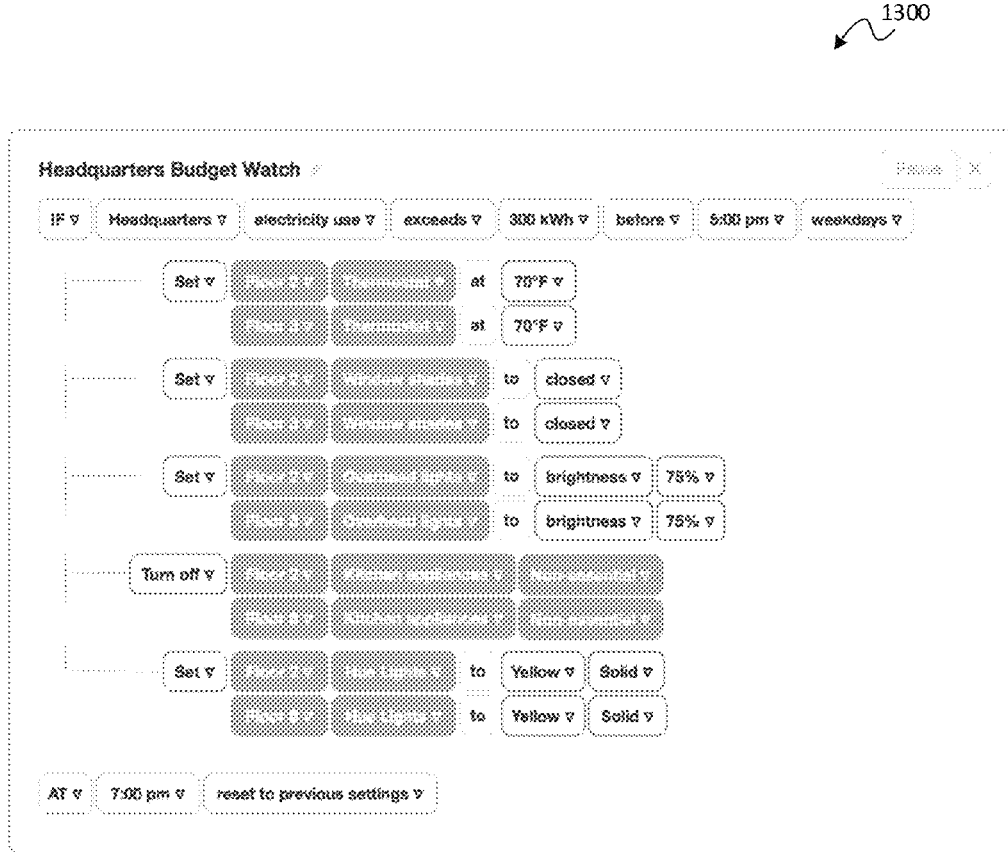
FIG. 13 is a screenshot diagram depicting a control sequence that may be used to implement a headquarters budget watch initiative.

Referring to FIG. 13, a screenshot diagram 1300 illustrates a control sequence that may be used to implement a headquarters budget watch initiative. The user 100 may specify a threshold (in this case, a budgeted allotment of total electricity consumption in a facility) at which a set of actions are applied. At "Turn off," the user 100 is specifying multiple groups that are defined in BuildingOS. In this case, only "Kitchen appliances" that are also of the "Nonessential" group will be turned off, while all monitored entities that are of the "Essential" group will remain unaffected.

The state of other systems and devices is shown in additional examples of "closed" shades, "brightness" levels, and other lighting effects ("yellow, solid"). Here, the user 100 has chosen the option to have previous settings reset at the end of the work day.

Figure 14:
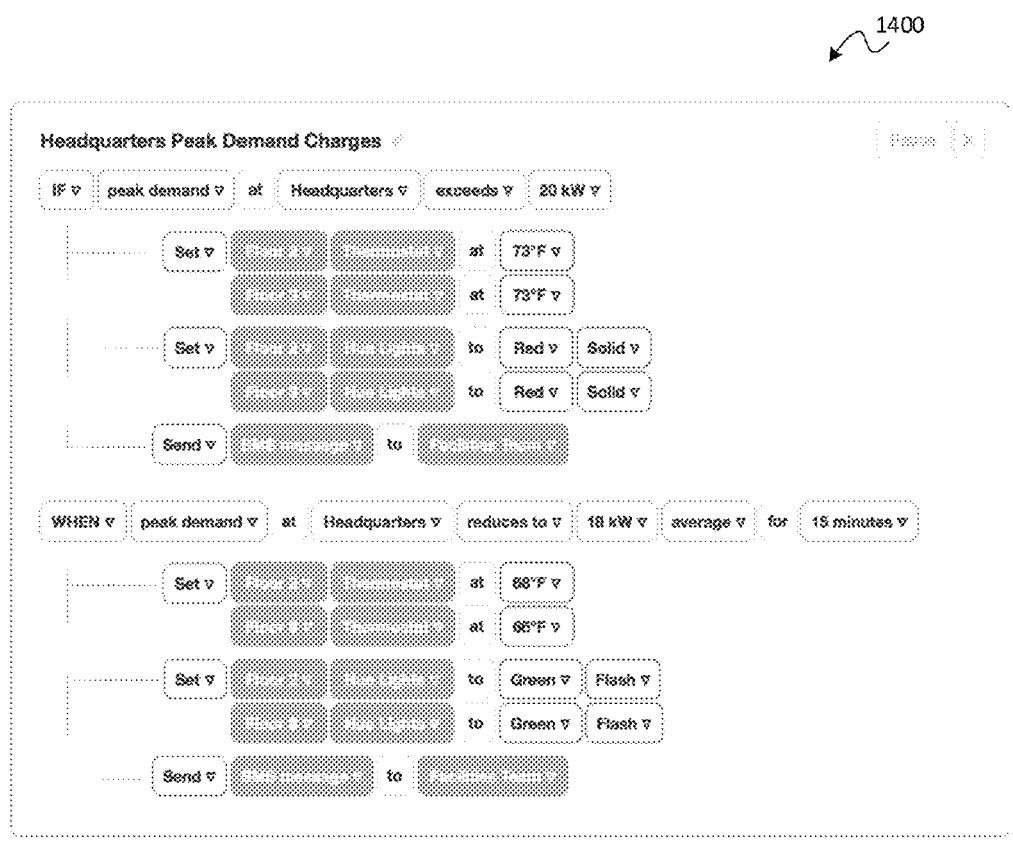
FIG. 14 is a screenshot diagram depicting a control sequence that may be used to implement a headquarters peak demand charges initiative.

Referring to FIG. 14, a screenshot diagram 1400 illustrates a control sequence that may be used to implement a headquarters peak demand charges initiative. In this controls sequence, the user 100 may determine what locations, systems, and devices will be affected when a facility's consumption reaches or exceeds a threshold, and what happens after the facility's consumption has reduced to a previously acceptable level for a specified period of time. Though not shown here, when paired with a Demand Response provider, such as when a signal from a third-party or utility is broadcast to the consumer, actions may also be specified that confirm that the "DR event" has successfully reduced current electricity demand to satisfy curtailment requirements.

Figure 15A:
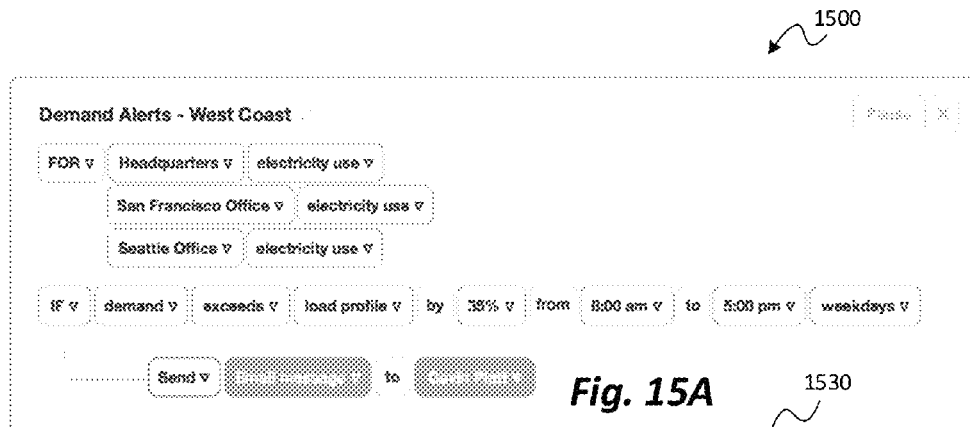
FIGS. 15A, 15B, and 15C are screenshot diagrams depicting various control sequences that may be used to implement demand alerts related to the operation of one or more facilities.
Figure 15B:
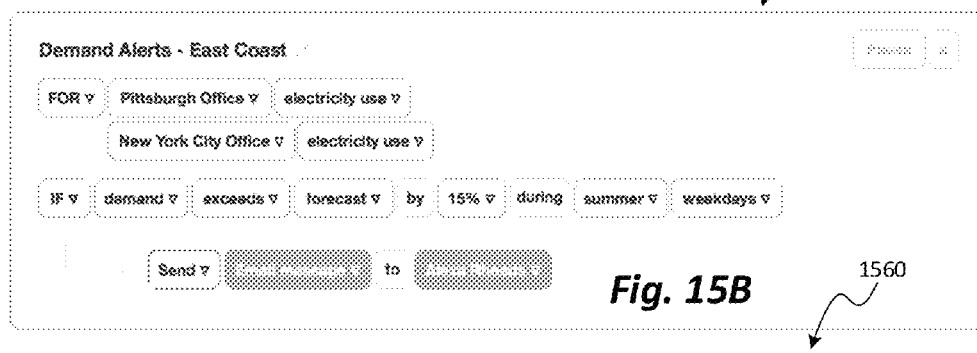
Figure 15C:
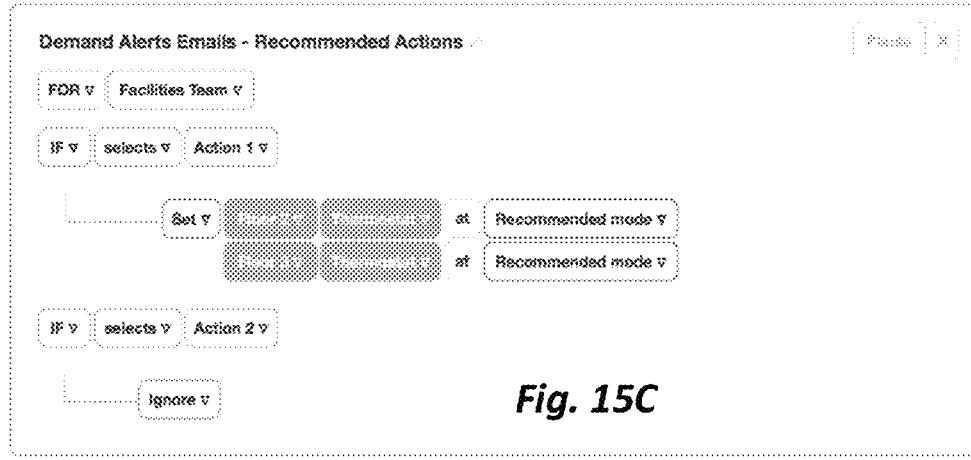

Referring to FIGS. 15A, 15B, and 15C, screenshot diagrams 1500, 1530, and 1560, respectively, illustrate various control sequences that may be used to implement demand alerts related to the operation of one or more facilities through the use of BuildingOS. FIG. 15A illustrates a West Coast demand alerts control sequence. FIG. 15B illustrates an East Coast demand alerts control sequence. FIG. 15C illustrates a demand alerts emails control sequence.

In FIGS. 15A and 15B, the user 100 may determine what happens at multiple specified locations. At a specified threshold, satisfaction of a condition (i.e., a control condition 260) may cause a message to be sent to a user 100 of BuildingOS that is associated with the specified locations.

In FIG. 15C, the user 100 may first determine the applicable group of users 100 in BuildingOS to which the subsequent actions will be applied. In this case, users 100 belonging to "Facilities Team" have previously received an email with two options. If they select Action 1, then thermostat settings will be changed. If they select Action 2, then nothing will happen.

Figures 16A, 16B, 16C:
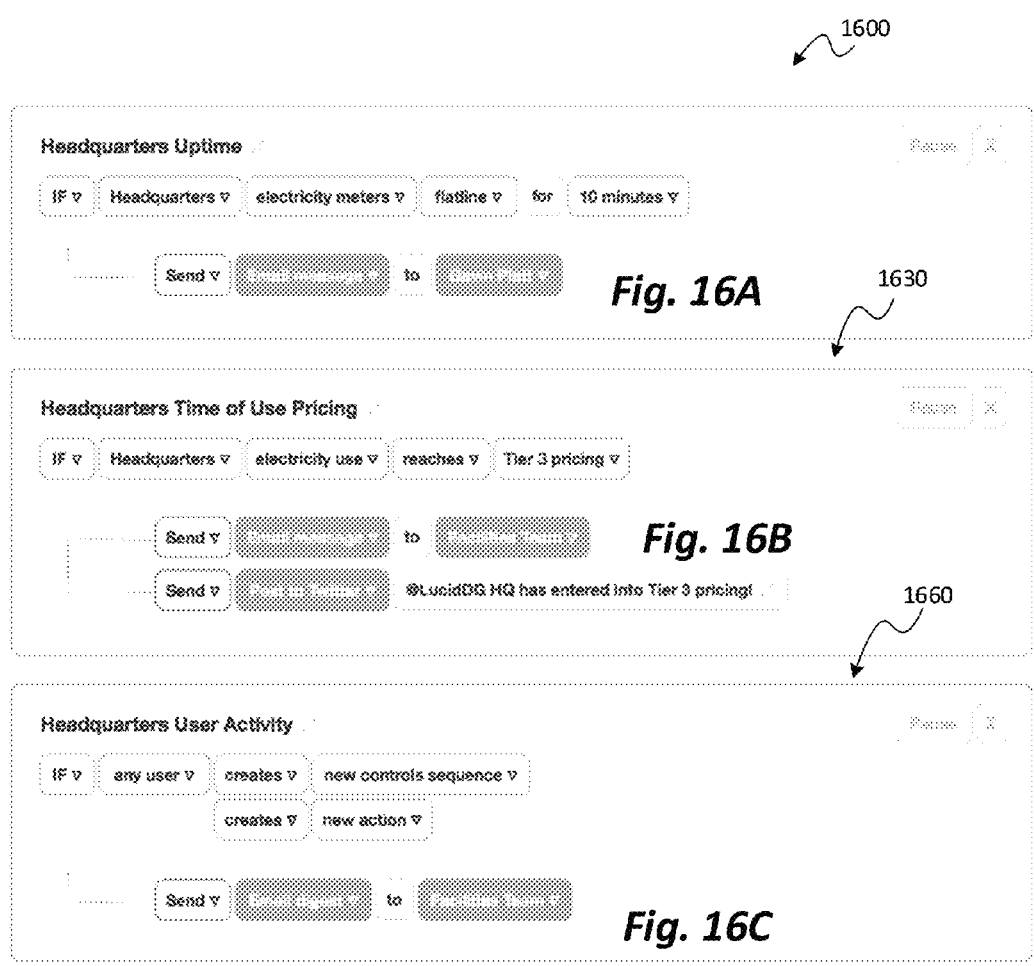
FIGS. 16A, 16B, and 16C are screenshot diagrams depicting various control sequences that may be used to monitor uptime, time of use pricing, and user activity.

Referring to FIGS. 16A, 16B, and 16C, screenshot diagrams 1600, 1630, and 1660, respectively, illustrate various control sequences that may be used to monitor uptime, time of use pricing, and user activity through the use of BuildingOS. FIG. 16A illustrates a control sequence for monitoring uptime. FIG. 16B illustrates a control sequence for monitoring time of use pricing. FIG. 16C illustrates a control sequence for monitoring user activity.

In FIG. 16A, the user 100 may specify when BuildingOS will issue a notification about the uptime status of a meter. In FIG. 16B, the user 100 may specify multiple notifications that will issue when electricity consumption has reached a threshold defined by the group "Tier 3 pricing." In FIG. 16C, the user 100 may specify that the "Facilities Team" group should receive an email summary or audit of all newly created sequences or actions within BuildingOS.

Figure 17A:
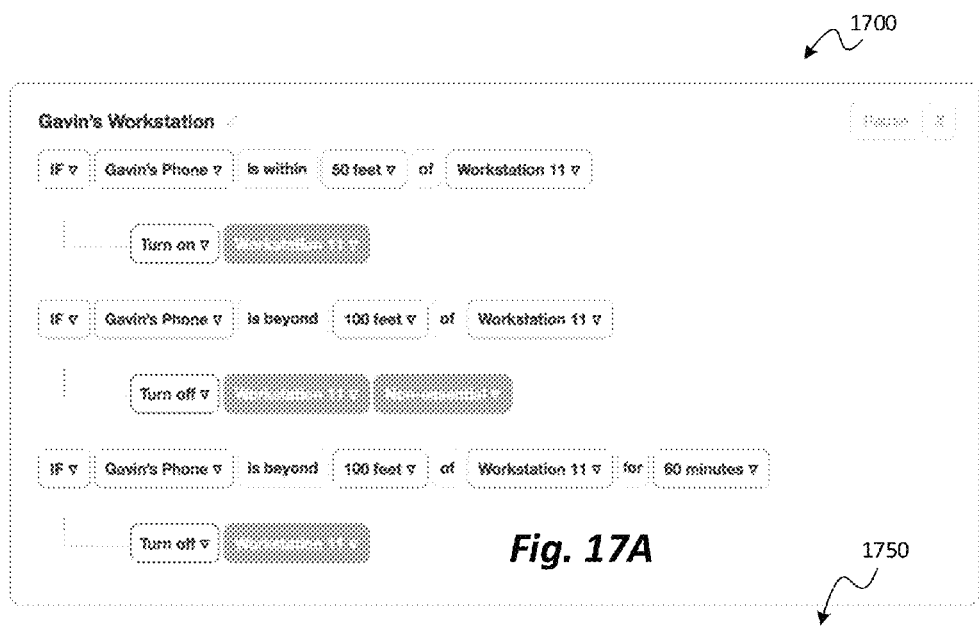
FIGS. 17A and 17B are screenshot diagrams depicting various control sequences that may be used to monitor an individual workstation location or modulate facility services based on the location of individual workstations.
Figure 17B:
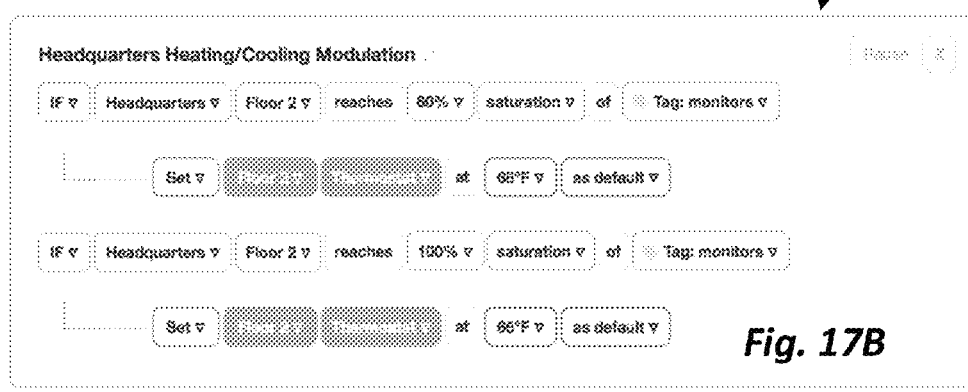

Referring to FIGS. 17A and 17B, screenshot diagrams 1700 and 1750 illustrate various control sequences that may be used to monitor an individual workstation location or modulate facility services based on the location of individual workstations through the use of BuildingOS. FIG. 17A illustrates a control sequence for monitoring an individual's workstation. FIG. 17B illustrates a control sequence for modulating heating and/or cooling based on the location of individual workstations.

In FIG. 17A, the user 100 may specify a perimeter boundary around a given system or device ("Gavin's Workstation"), or a group of systems and devices. When a device (in this case, somebody's phone) exceeds a certain distance from the physical location of the group (a control condition 260), an action (a control action 270) may ensue. A further action may ensue after the device is far enough away for a certain amount of time.

In FIG. 17B, the user 100 may specify a "saturation" level of proximate systems or devices (in this case, those belonging to a group or having a tag called "monitors") belonging at the location of Headquarters that will result in an action (a control action 270). In this case, the action may adjust the setpoint temperature of a thermostat and also allows the user to specify "as default," thus instantiating a new referenceable object in BuildingOS that corresponds to these parameters.

Figure 18A:
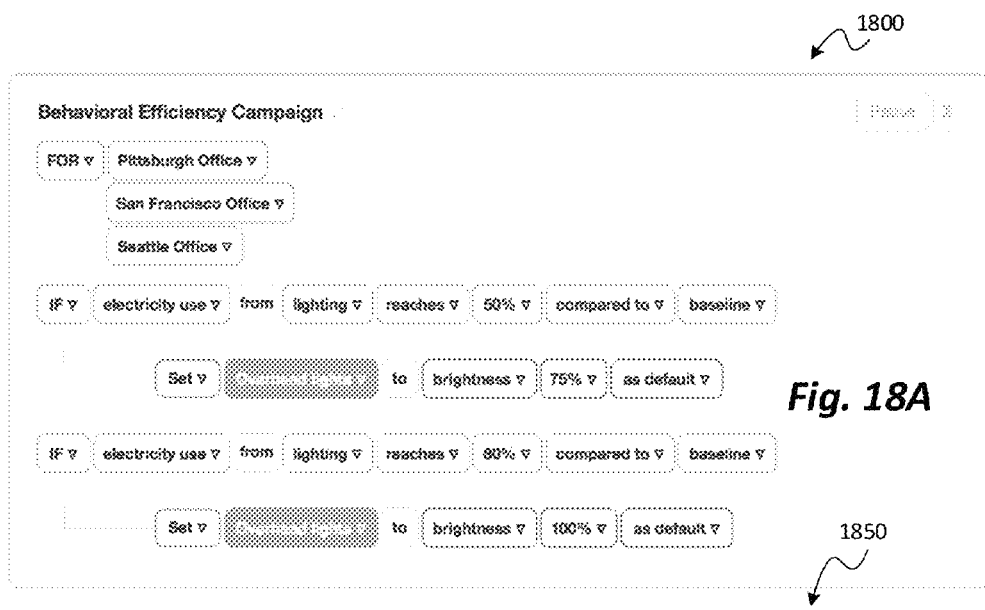
FIGS. 18A and 18B are screenshot diagrams depicting various control sequences that may be used to implement a behavioral efficiency campaign or to facilitate user adjustment of facility services.
Figure 18B:
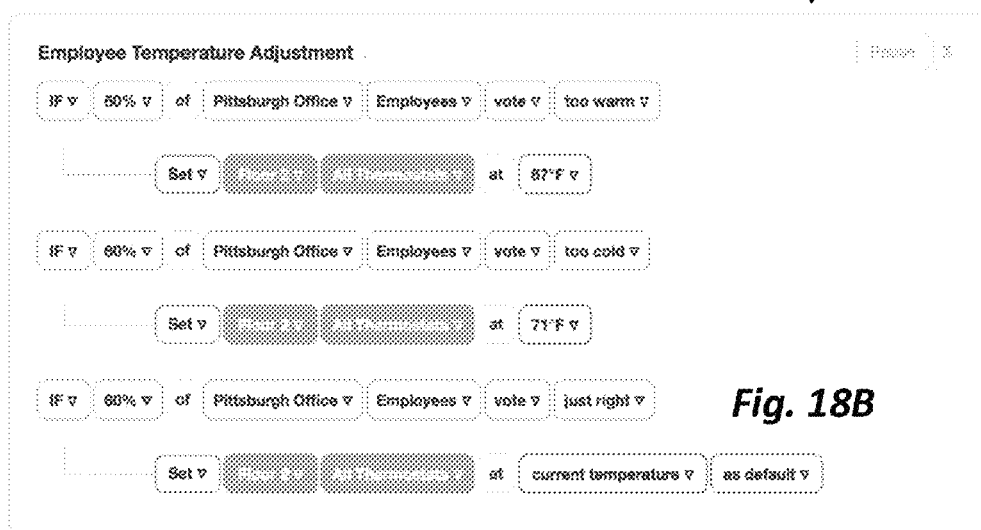

Referring to FIGS. 18A and 18B, screenshot diagrams 1800 and 1850 illustrate various control sequences that may be used to implement a behavioral efficiency campaign or to facilitate user adjustment of facility services through the use of BuildingOS. FIG. 18A illustrates a control sequence for implementing a behavioral efficiency campaign. FIG. 18B illustrates a control sequence for implementing user adjustment of the heating or cooling of a building.

In FIG. 18A, the user 100 may specify for what facilities a relative increase in the electricity consumption of a given group of systems and devices compared to a previous baseline will trigger an action. The action may then control the settings of the grouped systems and devices. In this case, changes in lighting electricity consumption that are the result of tenant or occupant behavior in these facilities may indirectly cause the action to trigger. BuildingOS may instantiate and apply "as default" the new brightness level as a result of actual behavior in the facility.

In FIG. 18B, the user 100 may specify the ensuing actions when other users "vote" to express their relative comfort level. In this "crowdsourcing" example, occupants may use BuildingOS to determine the collective sentiment of the facility's occupants, thus directly affecting the settings of monitored systems and devices.

Figure 19:
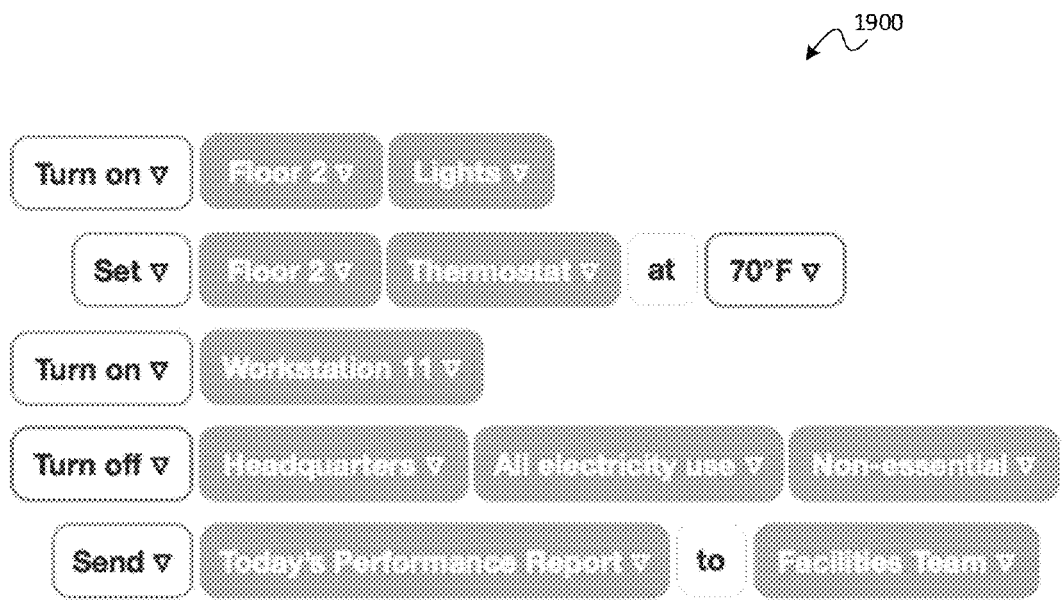
FIG. 19 is a screenshot diagram depicting various "on-demand" actions that may be issued quickly, without the formal construction of a controls sequence.

Referring to FIG. 19, a screenshot diagram 1900 illustrates various "on-demand" actions that may be issued quickly, without the formal construction of a controls sequence. Such actions may be undertaken through BuildingOS without creating a control record 112, and therefore without establishing control conditions 260. Additionally or alternatively, these actions may be embedded in a single, aggregate action or sequence; hence, a controls sequence may also serve to provide on-demand changes to a system or device.

Figure 20:
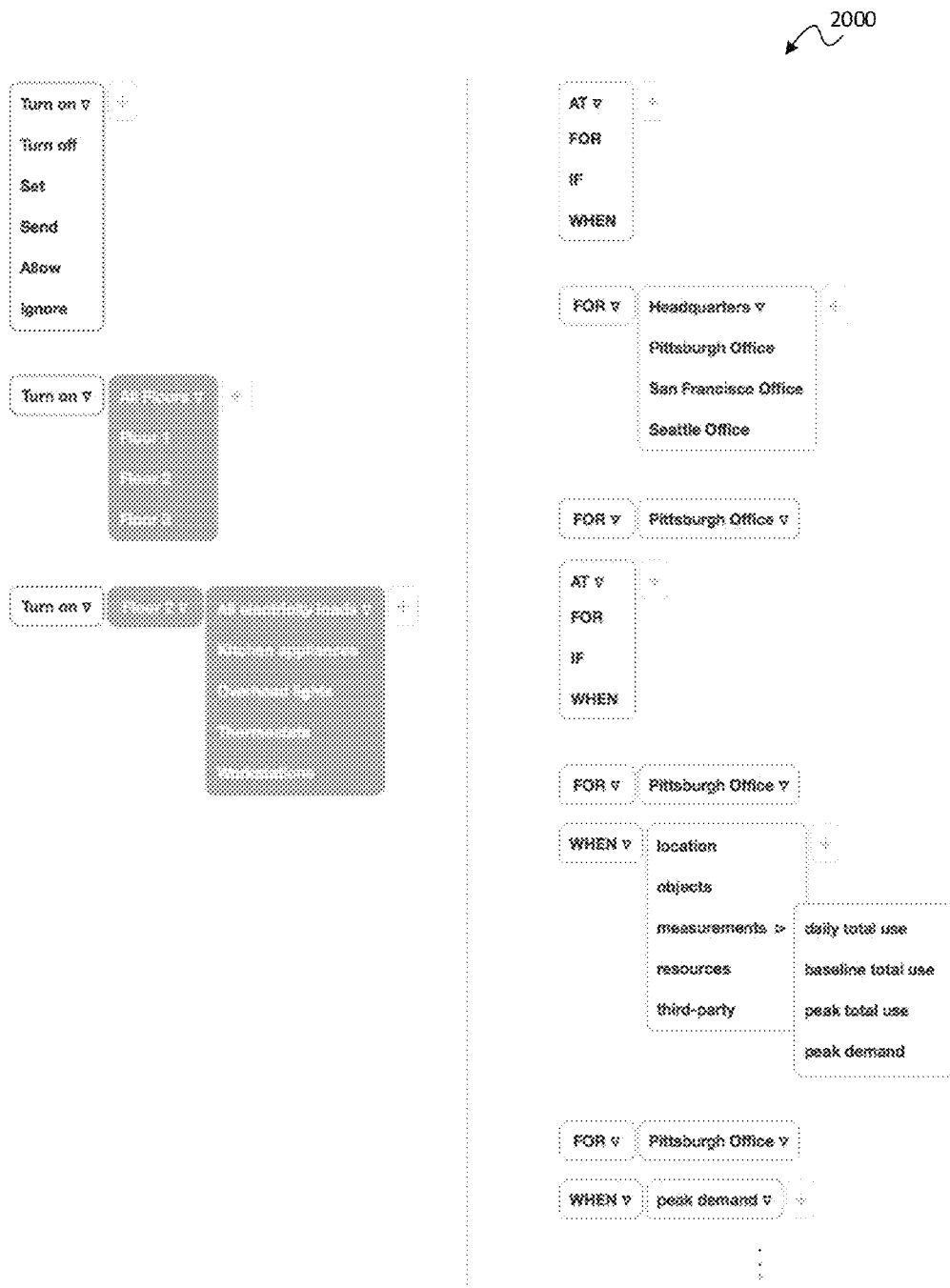
FIG. 20 is a screenshot diagram depicting examples of how a sequence or action may be constructed.

Referring to FIG. 20, a screenshot diagram 2000 illustrates examples of how a sequence or action may be constructed. BuildingOS may provide sequences and/or actions that are "suggestive" and/or "conditional." This may allow for rapid, intuitive construction of commands and easy access to all possible sequence and action constructs. BuildingOS may supply a probable sequence of subsequent actions after the first action is specified. Users 100 may also pause/un-pause, duplicate, and/or delete a sequence or action.

User Interface

FIGS. 11A through 20 above illustrate various aspects of one possible user interface for BuildingOS. Further exemplary user interface elements will be shown and described in connection with FIGS. 21 through 34, as follows. One skilled in the art will recognize that other arrangements and layouts are possible within the scope of the present disclosure.

Figure 21:
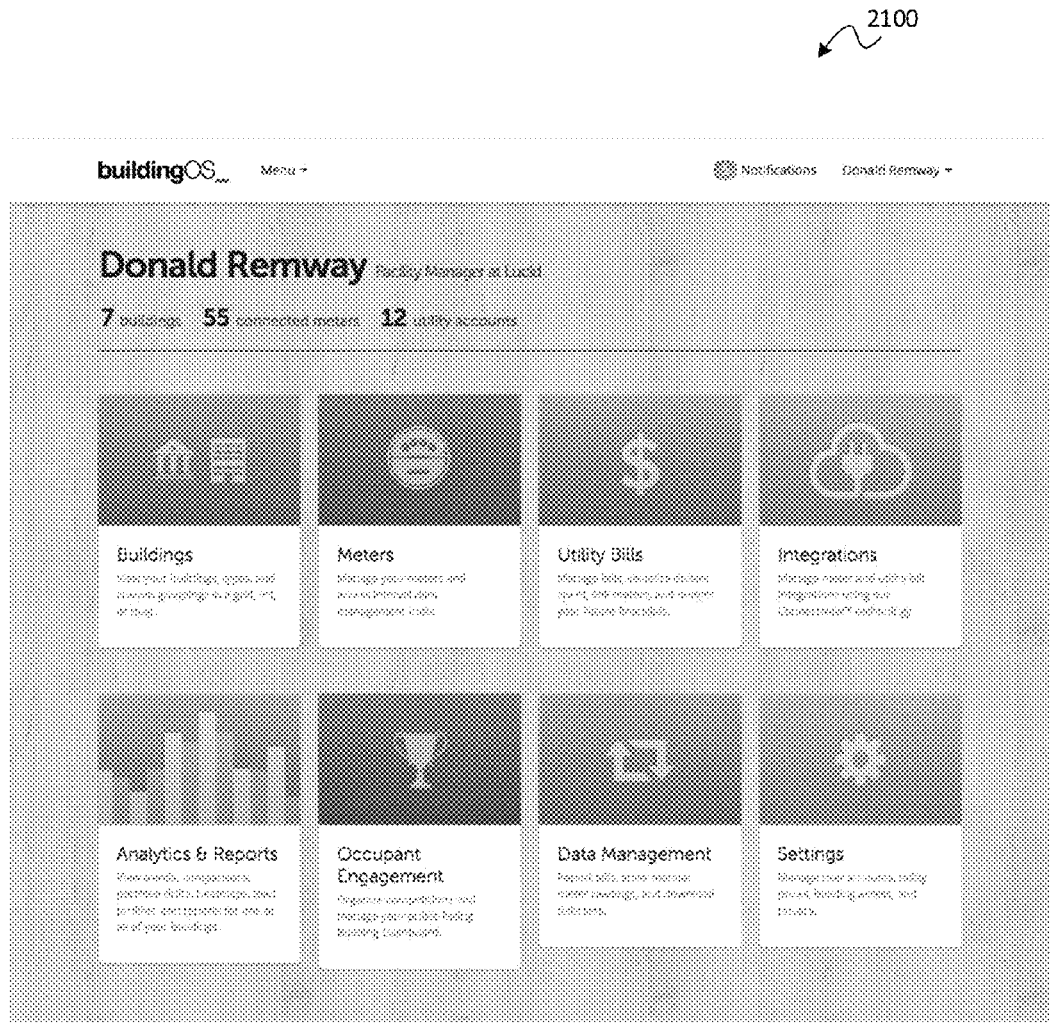
FIG. 21 is a screenshot diagram illustrating a Homepage, according to one embodiment.

FIG. 21 is a screenshot diagram 2100 illustrating a Homepage for BuildingOS, according to one embodiment. Clicking on "Facilities & Meters" may cause BuildingOS to navigate to a Facilities and Meters page, as shown in FIG. 22.

Figure 22:
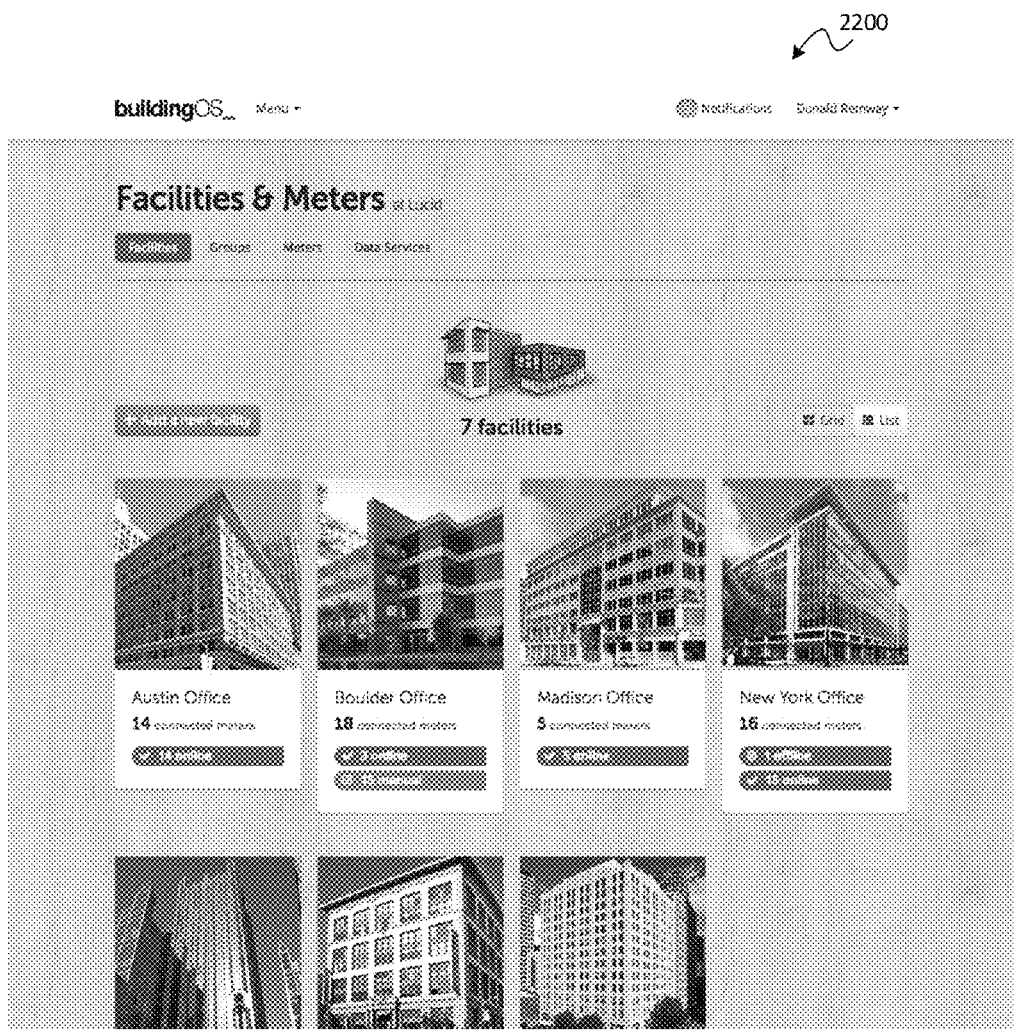
FIG. 22 is a screenshot diagram illustrating a Facilities and Meters page, according to one embodiment.
Figure 23:
FIG. 23 is a screenshot diagram illustrating an Add a New Facility page, according to one embodiment.

FIG. 22 is a screenshot diagram 2200 illustrating a Facilities and Meters page. Clicking on "Add a New Facility" may cause BuildingOS to navigate to an Add a New Facility page, as shown in FIG. 23. Clicking on "Meters" may cause BuildingOS to navigate to a Meters subpage, as shown in FIG. 24.

FIG. 23 is a screenshot diagram 2300 illustrating an Add a New Facility page. The Add a New Facility page may have a web-fillable form in which the user 100 can enter the configuration of the new facility, which may include location information and/or other metadata.

Figure 24:
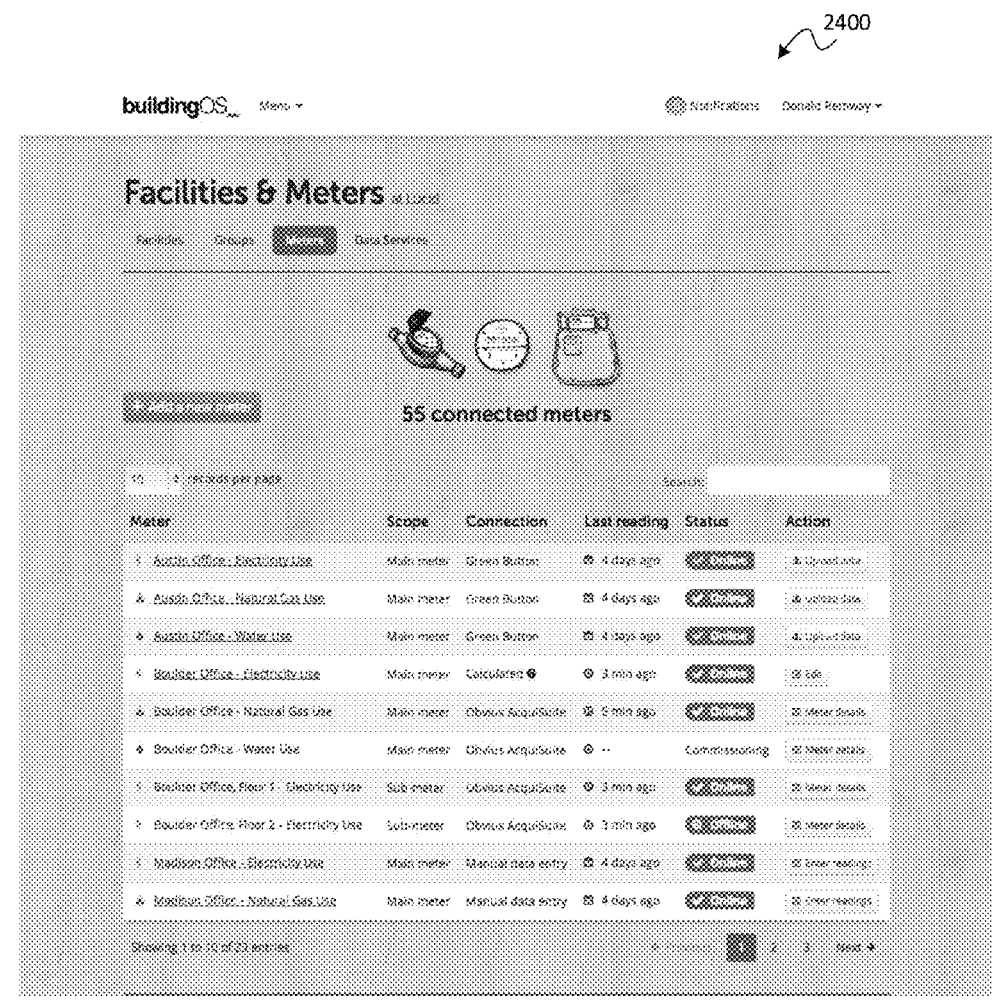

FIG. 24 is a screenshot diagram 2400 illustrating a Meters subpage. The Meters subpage may have a list of connected data sources, which may all be listed as "meters." Clicking on "Add a New Meter" may cause BuildingOS to navigate to the "Add a New Meter" page shown in FIG. 25.

Figure 25:
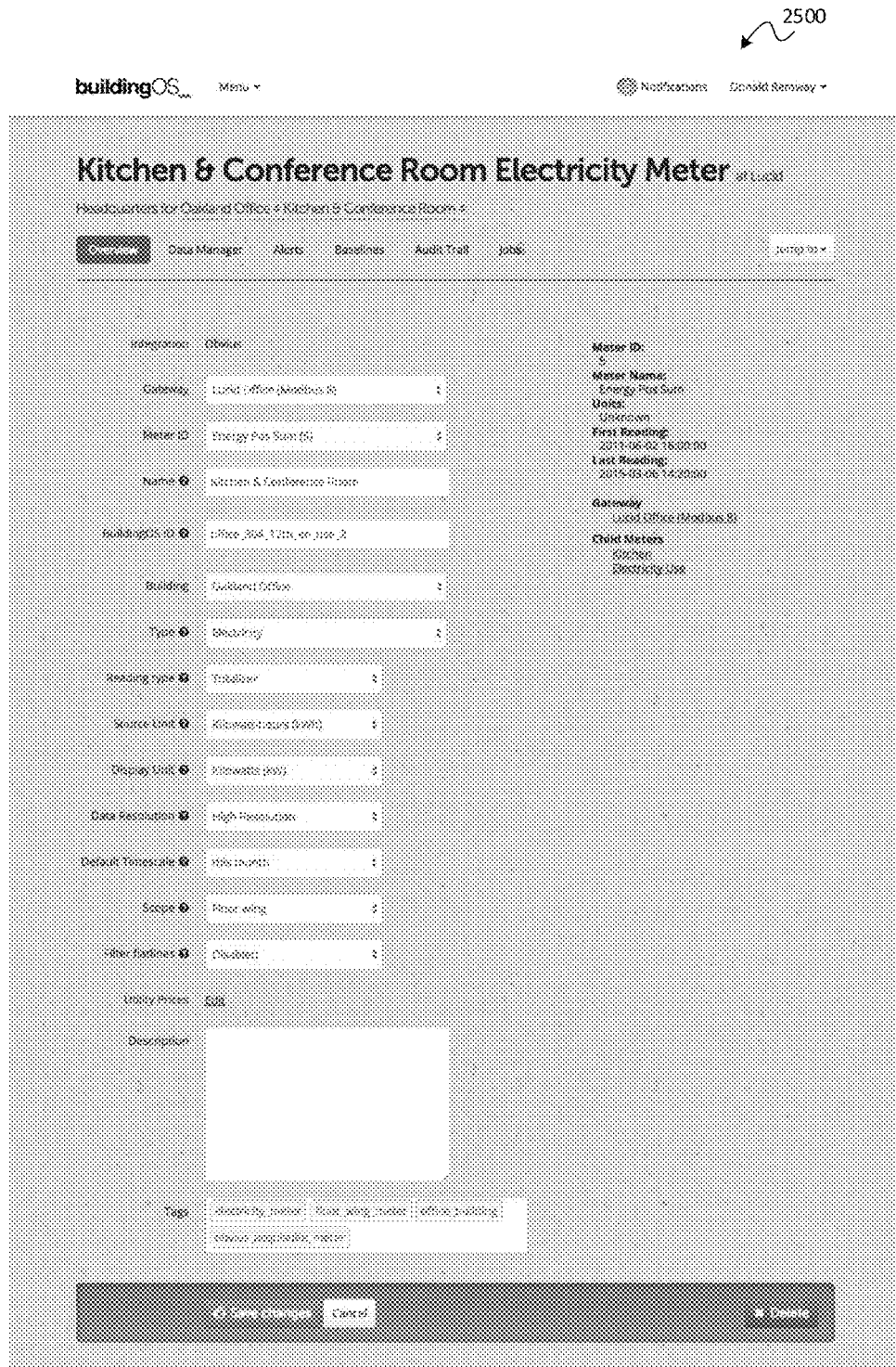
FIG. 25 is a screenshot diagram illustrating an Add a New Meter page, according to one embodiment.

FIG. 25 is a screenshot diagram 2500 illustrating an Add a New Meter page. The Add a New Meter page may have a web-fillable form in which the user 100 can enter configuration information for the new meter. This configuration information may include a variety of parameters and/or other metadata depending on the data service type.

Figure 26:
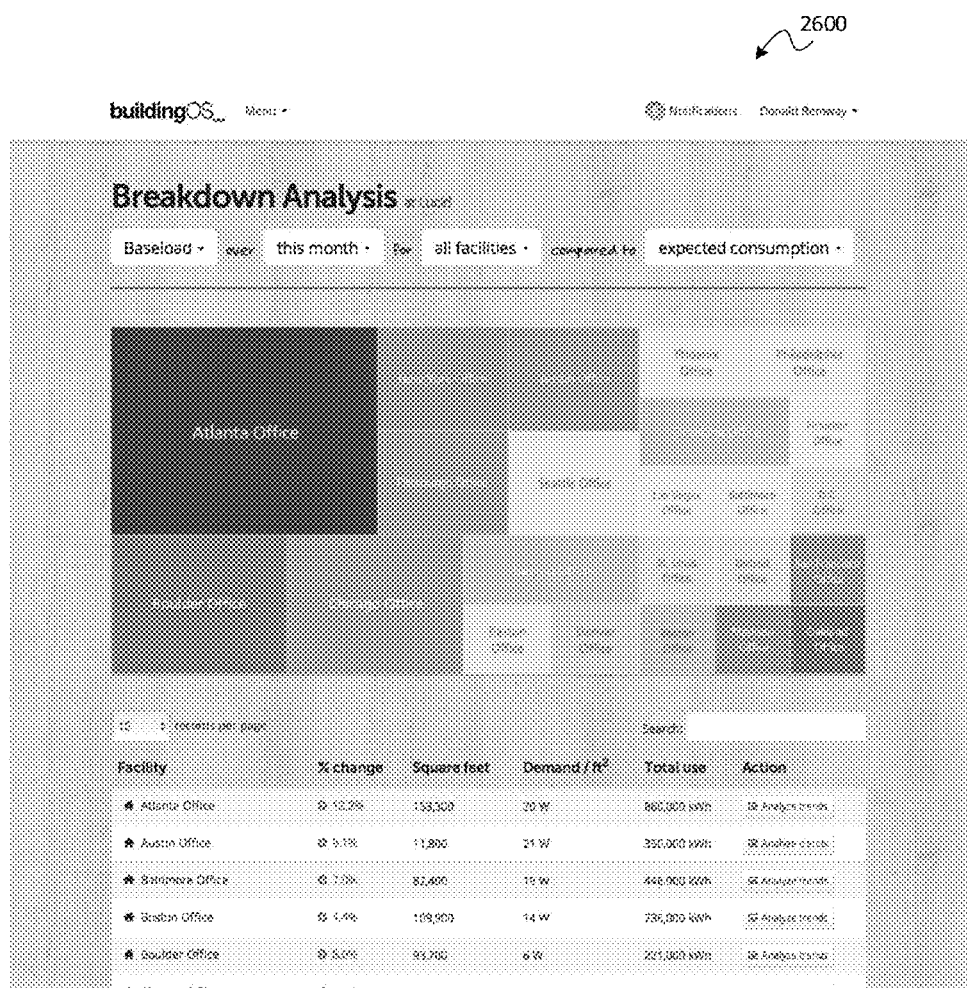
FIG. 26 is a screenshot diagram illustrating a Breakdown Analysis page, according to one embodiment.

FIG. 26 is a screenshot diagram 2600 illustrating a Breakdown Analysis page. The Breakdown Analysis page may provide a portfolio-wide view of performance. This view may help to prioritize the biggest opportunities for improvement and may enable the user 100 to measure and/or validate savings over time. The visual language ("sentence structure") menu at the top may be common across multiple different pages of BuildingOS, and may thus be used to build or modify control records 112, select an on-demand action, and/or select data for display, or visualization.

Figure 27:
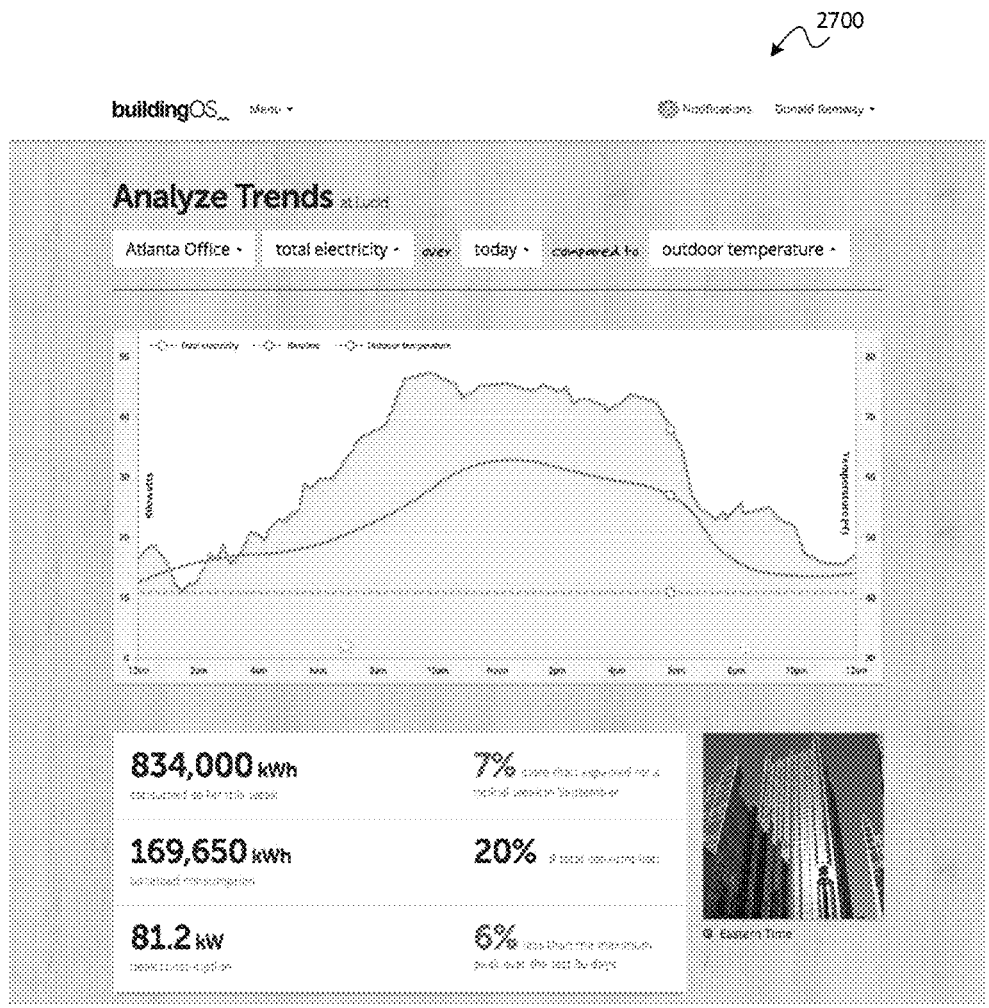
FIG. 27 is a screenshot diagram illustrating an Analyze Trends page, according to one embodiment.

FIG. 27 is a screenshot diagram 2700 illustrating an Analyze Trends page. The Analyze Trends page may provide trend analysis tools that enable the user 100 to easily track changes, compare resources and other monitored variables, and/or carry out other analytical steps.

Figure 28:
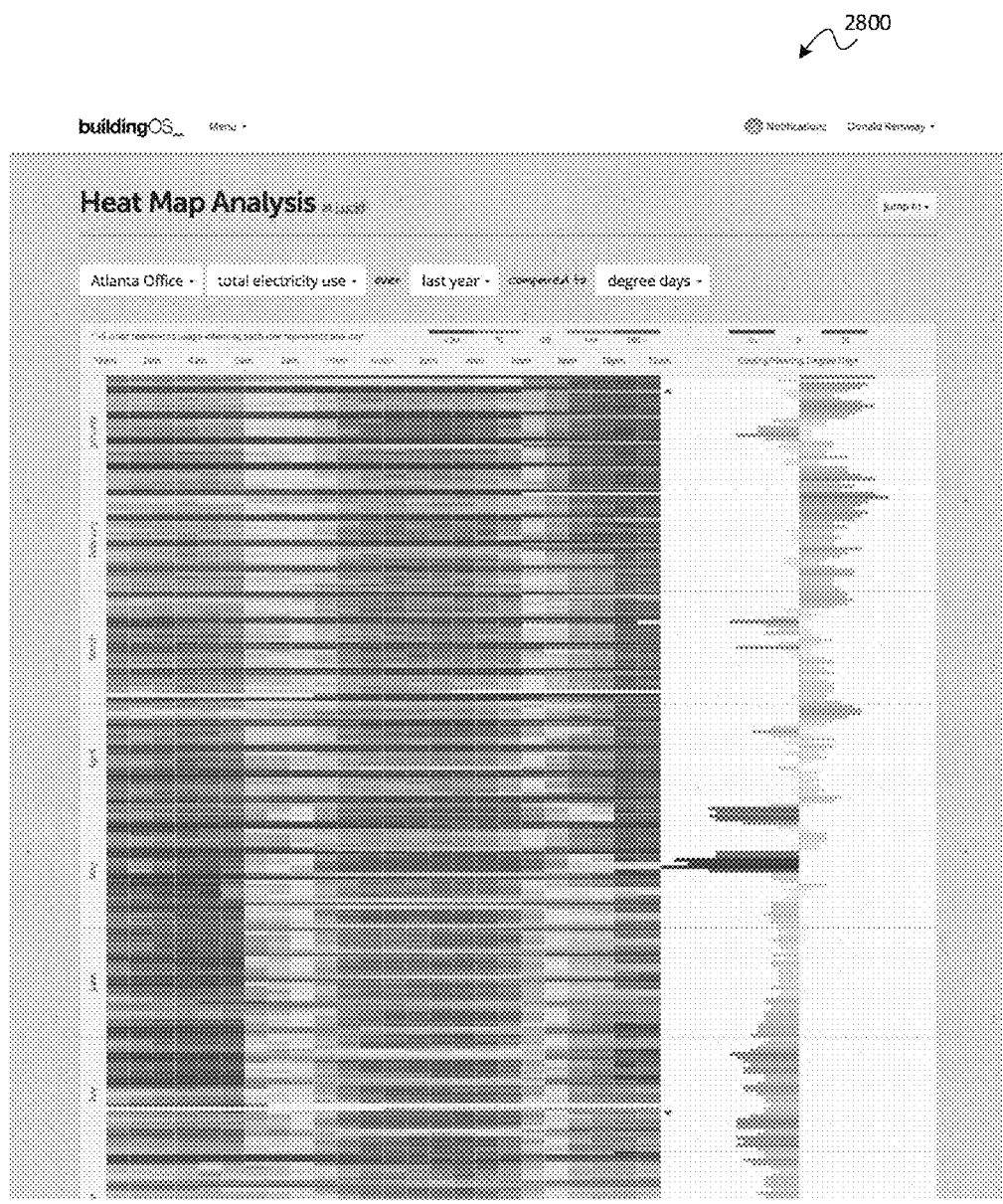
FIG. 28 is a screenshot diagram illustrating a Heat Map Analysis page, according to one embodiment.

FIG. 28 is a screenshot diagram 2800 illustrating a Heat Map Analysis page. The Heat Map Analysis page may allow the user 100 to optimize scheduling during nights, weekends, and holidays by showing how much energy the facilities are using. Energy consumption may be shown on a daily, weekly, or annual basis, and may optionally include all hours (i.e., not just those in which the facility is expected to be used or the corresponding business is operating). By making low-cost or no-cost adjustments to HVAC and lighting systems, for example, the user 100 may create opportunities for recurring savings on their electricity bills.

Figure 29:
FIG. 29 is a screenshot diagram illustrating a portion of a Heat Map Analysis page with annotations, according to one embodiment.

FIG. 29 is a screenshot diagram 2900 illustrating a portion of a Heat Map Analysis page. In at least one embodiment, within the Heat Map Analysis page, the user 100 may identify areas on the heat map that correspond to anomalies. Such anomalies may include, for example, an unusually high level of consumption (for example, due to time of day, the time of week, or seasonal differences), a controls system scheduling problem, and/or a malfunctioning piece of equipment. The user 100 may highlight such anomalies via, for example, clicking and dragging. Optionally, the user 100 may have the ability to select areas that are non-contiguous.

In FIG. 29, a portion of time is highlighted (12 am-6 am, January 13-17) during which unusually high consumption has been spotted. This energy waste has been commented on by the user 100, as shown in the corresponding window at right (where the user 100 has written "Waste!"). This may be shown when the user 100 highlights this portion of the graph or hovers over the marker at the vertical position along the graph near where the highlighted portion is located. In at least one embodiment, the user 100 is presented with three options:

Message. The user 100 may send a message or have BuildingOS send a notification to one or more other users 100 indicating that they should, for instance, examine the data in this highlighted area.

Forecast. The user 100 may have BuildingOS produce a forecast showing a) energy costs associated with the highlighted portion, b) wasted energy as compared to normal consumption, and/or c) potential savings that may be obtained with possible curtailment strategies.

Curtail. The user 100 may have BuildingOS recommend or automate a curtailment strategy for remedying the unusually high consumption at similar periods in the future. For instance, 12 am-6 am from January 20-24 appears to have similarly high consumption, which could benefit from a user-assisted or automatic curtailment of energy use.

Figure 30:
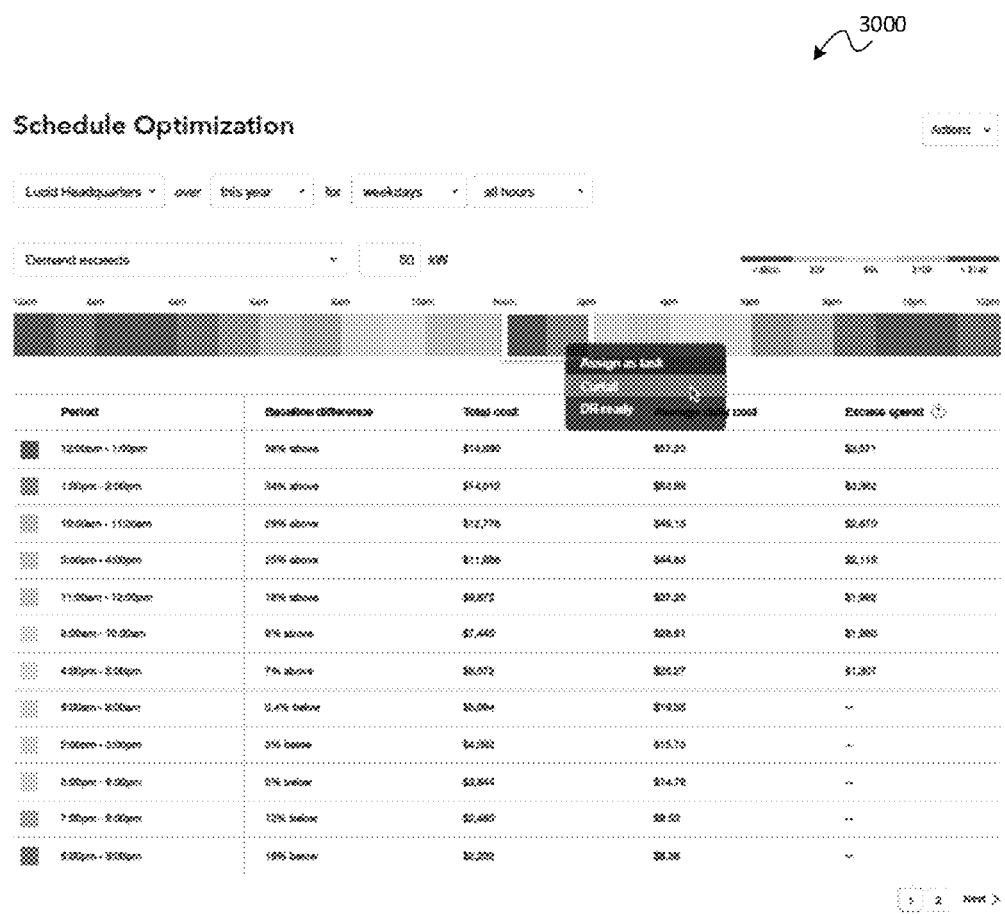
FIGS. 30-34 are various Schedule Optimization pages, according to exemplary embodiments.
Figure 31:
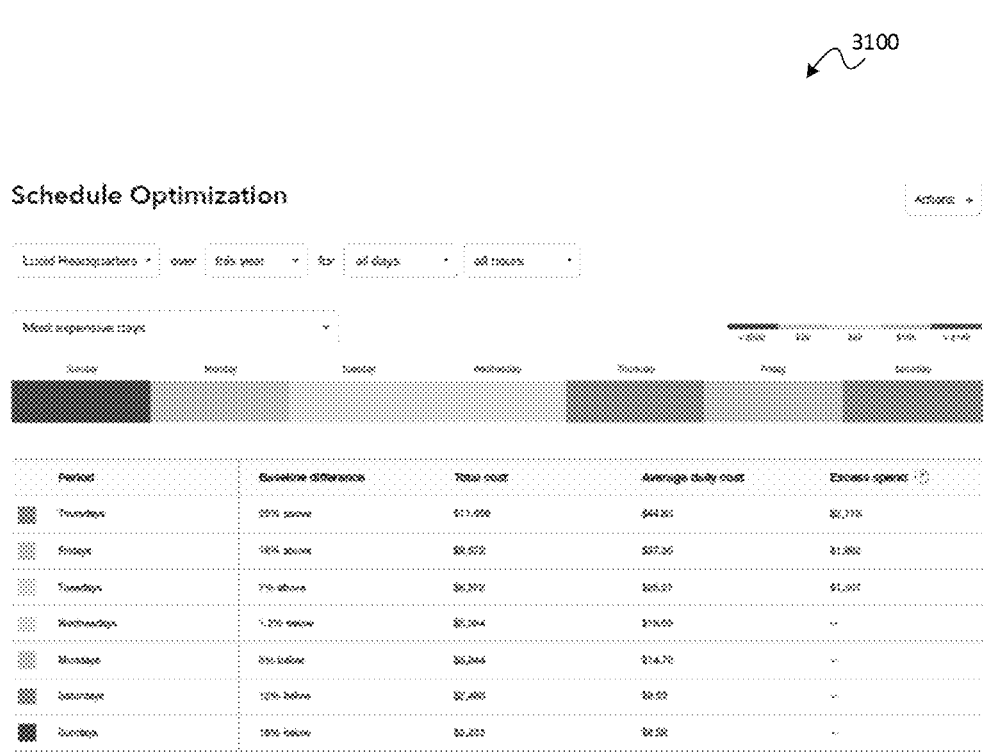

FIG. 30 is a screenshot diagram 3000 illustrating a Schedule Optimization page. The Schedule Optimization page may provide further analytical tools, and may also serve as a gateway for display of a heat map such as that of FIG. 28. The Schedule Optimization page may facilitate scheduling of services for the one or more facilities.

Notably, FIG. 30 may provide the user 100 with the options "Assign as Task," "Curtail," and "DR-Ready." The "Assign as Task" option may assign a task to a user 100 of BuildingOS to take action. The "Curtail" option may be used to curtail excessive services, as described previously. The "DR-Ready" function may be automated by BuildingOS, and may indicate to a connected system (such as a third-party demand response provider) that the selected area corresponds to when the user 100 would like for DR services to apply.

The Schedule Optimization page may provide for multiple views, including but not limited to "roll-ups" or summaries of hourly, daily, monthly, and yearly periods. In some embodiments, the user 100 may click on a cell or series of cells and "drill down" into these roll-ups to reveal underlying data. It may be helpful for the user 100 to look at the same data in different dimensions in order to notice different patterns regarding provision of the services to the one or more facilities.

Figure 32:
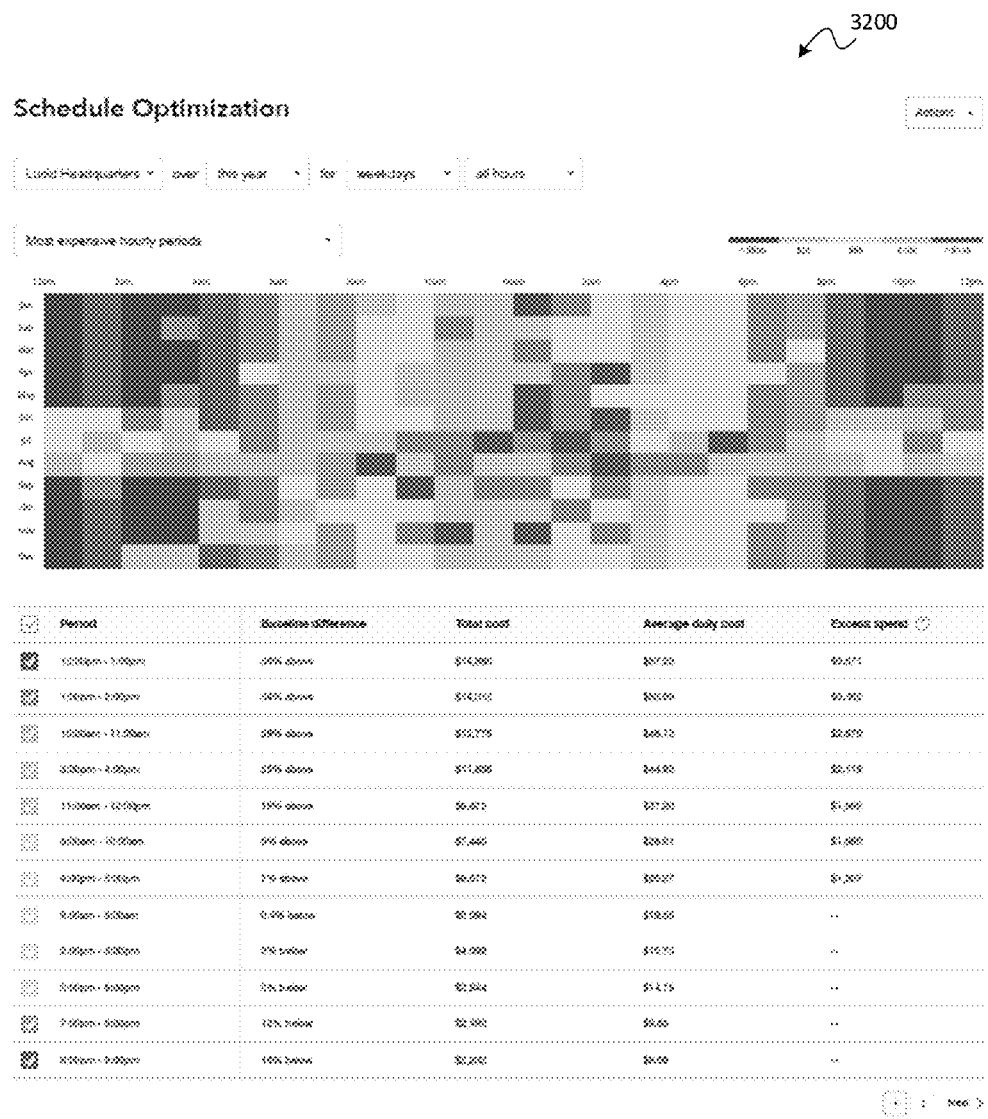
Figure 33:
Figure 34:

FIGS. 31-34 are screenshot diagrams 3100, 3200, 3300, and 3400, respectively, illustrating other Schedule Optimization page views that may be available in BuildingOS. FIGS. 32, 33, and 34 illustrate heat maps that may be used in ways similar to those set forth in the descriptions of FIGS. 28 and 29.

The heat map data provided by BuildingOS may present data from any of the meters connected to the system 300. FIG. 34 illustrates the provision of data regarding occupancy, $CO_2$ levels, work orders, and the like. Each data set illustrated in any data visualization, such as the heat maps of FIGS. 32, 33, and 34, may be visualized along many possible dimensions.

For example, with reference to FIG. 34, if the user 100 is visualizing data from an energy meter, then the user 100 may look at the source unit of electricity (either kilowatts or kilowatt-hours). The user 100 may also want to view the precise dollar cost of energy at all those particular dates and times, which may be done by including data from the inputs of "utility tariff and rate engine systems", "demand response providers", and "bill management systems." By taking into account the tariff structure of a particular organization's utility bill account, any peak demand charges levied by their utility, any savings accrued by participating in a demand response program, and any additional information such as "time of use pricing" that charges differently throughout the day or the taxes and fees found on their utility bill, the user 100 may obtain a very precise dollar cost of energy in the heat map.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for controlling a plurality of services for one or more facilities, the method comprising:

at a data store, receiving a first meter catalog that identifies a first meter connected to the one or more facilities to perform at least one of controlling and monitoring provision of a first service of the plurality of services to the one or more facilities;

at the data store, receiving a second meter catalog that identifies a second meter connected to the one or more facilities to perform at least one of controlling and monitoring provision of a second service of the plurality of services to the one or more facilities;

at the data store, receiving first meter readings from the first meter, wherein the first meter readings are indicative of provision of the first service;

at the data store, receiving second meter readings from the second meter, wherein the second meter readings are indicative of provision of the second service;

at a processor, automatically processing the first meter readings to provide first processed meter readings that are more accurately indicative of provision of the first service than the first meter readings;

at the processor, automatically processing the second meter readings to provide second processed meter readings that are more accurately indicative of provision of the second service than the second meter readings;

at a display screen, displaying the first processed meter readings and the second processed meter readings;

at an input device, receiving input from a first user that establishes at least one of control of the first service and user reporting of the first service;

at the input device, receiving input from the first user that assigns a task to a second user to take an action in connection with at least one of the displayed processed meter readings; and transmitting a signal to the second user, specifying the assigned task.

2. The method of claim 1, wherein the first service is provided by a first vendor and the second service is provided by a second vendor different from the first vendor;
wherein receiving the first meter readings is carried out independently of recordation of the first vendor in the data store;
wherein receiving the second meter readings is carried out independently of recordation of the second vendor in the data store.

3. The method of claim 1, further comprising, prior to receiving the first meter catalog:
connecting the data store to the first meter via the Internet;
automatically discovering the first meter via the Internet; and
transmitting the first meter catalog to the data store over the Internet.

4. The method of claim 1, further comprising, prior to processing the first meter readings and prior to processing the second meter readings:
automatically normalizing the first meter readings; and
automatically normalizing the second meter readings such that the first meter readings and the second meter readings are on a common time scale.

5. The method of claim 1, wherein processing the first meter readings comprises:
automatically identifying a spike in the first meter readings;
automatically analyzing the spike to determine that the spike is not indicative of provision of the first service; and
automatically modifying the first meter readings to remove the spike.

6. The method of claim 1, wherein processing the first meter readings comprises:
automatically identifying a flatline in the first meter readings;
automatically analyzing the flatline to determine that the flatline is not indicative of provision of the first service; and
automatically modifying the first meter readings to remove the flatline.

7. The method of claim 1, wherein processing the first meter readings comprises computing weighted average values of the first meter readings.

8. The method of claim 1, wherein receiving the input from the first user comprises providing a sentence structure with user-selectable terms that can be used to specify at least one control condition and a control action that is to be automatically executed if the at least one control condition is satisfied.

9. The method of claim 1, wherein receiving the input from the first user comprises:
receiving at least one control condition from the first user; and
receiving a control action from the first user, wherein the control action is to be automatically executed if the at least one control condition is satisfied.

10. The method of claim 9, further comprising:
at the processor, automatically comparing the first processed meter readings with the at least one control condition;
in response to comparison of the first processed meter readings with the at least one control condition, automatically determining that the at least one control condition has been satisfied; and
in response to determining that the at least one control condition has been satisfied, automatically executing the control action.

11. The method of claim 10, wherein automatically executing the control action comprises automatically modifying provision of the first service.

12. The method of claim 10, wherein automatically executing the control action comprises automatically transmitting a notification to the first user indicating that the at least one control condition has been satisfied.

13. The method of claim 1, further comprising, at the display screen, displaying a data visualization depicting the first processed meter readings and the second processed meter readings.

14. The method of claim 13, wherein the data visualization comprises a heat map.

15. A non-transitory computer-readable medium for controlling a plurality of services for one or more facilities, comprising instructions stored thereon, that when executed by a processor, perform the steps of:
causing a data store to receive a first meter catalog that identifies a first meter connected to the one or more facilities to perform at least one of controlling and monitoring provision of a first service of the plurality of services to the one or more facilities;
causing the data store to receive a second meter catalog that identifies a second meter connected to the one or more facilities to perform at least one of controlling and monitoring provision of a second service of the plurality of services to the one or more facilities;
causing the data store to receive first meter readings from the first meter, wherein the first meter readings are indicative of provision of the first service;
causing the data store to receive second meter readings from the second meter, wherein the second meter readings are indicative of provision of the second service;
automatically processing the first meter readings to provide first processed meter readings that are more accurately indicative of provision of the first service than the first meter readings;
automatically processing the second meter readings to provide second processed meter readings that are more accurately indicative of provision of the second service than the second meter readings;
causing a display screen to display the first processed meter readings and the second processed meter readings;
causing an input device to receive input from a first user that establishes at least one of control of the first service and user reporting of the first service
causing an input device to receive input from the first user that assigns a task to a second user to take an action in connection with at least one of the displayed processed meter readings; and
causing a transmission device to transmit a signal to the second user, specifying the assigned task.

16. The non-transitory computer-readable medium of claim 15, wherein the first service is provided by a first vendor and the second service is provided by a second vendor different from the first vendor;
wherein receiving the first meter readings is carried out independently of recordation of the first vendor in the data store; and
wherein receiving the second meter readings is carried out independently of recordation of the second vendor in the data store.

17. The non-transitory computer-readable medium of claim 15, further comprising instructions stored thereon, that when executed by a processor, perform the steps of, prior to receiving the first meter catalog:
   connecting the data store to the first meter via the Internet;
   automatically discovering the first meter via the Internet; and
   transmitting the first meter catalog to the data store over the Internet.

18. The non-transitory computer-readable medium of claim 15, further comprising instructions stored thereon, that when executed by a processor, perform the steps of, prior to processing the first meter readings and prior to processing the second meter readings:
   automatically normalizing the first meter readings; and
   automatically normalizing the second meter readings such that the first meter readings and the second meter readings are on a common time scale.

19. The non-transitory computer-readable medium of claim 15, wherein processing the first meter readings comprises:
   automatically identifying a spike in the first meter readings;
   automatically analyzing the spike to determine that the spike is not indicative of provision of the first service; and
   automatically modifying the first meter readings to remove the spike.

20. The non-transitory computer-readable medium of claim 15, wherein processing the first meter readings comprises:
   automatically identifying a flatline in the first meter readings;
   automatically analyzing the flatline to determine that the flatline is not indicative of provision of the first service; and
   automatically modifying the first meter readings to remove the flatline.

21. The non-transitory computer-readable medium of claim 15, wherein receiving the input from the first user comprises providing a sentence structure with user-selectable terms that can be used to specify at least one control condition and a control action that is to be automatically executed if the at least one control condition is satisfied.

22. The non-transitory computer-readable medium of claim 15, wherein receiving the input from the first user comprises:
   receiving at least one control condition from the first user; and
   receiving a control action from the first user, wherein the control action is to be automatically executed if the at least one control condition is satisfied;
   wherein the non-transitory computer-readable medium further comprises instructions stored thereon, that when executed by a processor, perform the steps of:
   automatically comparing the first processed meter readings with the at least one control condition;
   in response to comparison of the first processed meter readings with the at least one control condition, automatically determining that the at least one control condition has been satisfied; and
   in response to determining that the at least one control condition has been satisfied, automatically executing the control action;
   wherein the control action is selected from the group consisting of:
   modifying provision of the first service; and
   transmitting a notification to the first user indicating that the at least one control condition has been satisfied.

23. The non-transitory computer-readable medium of claim 15, further comprising instructions stored thereon, that when executed by a processor, cause the display screen to display a data visualization depicting the first processed meter readings and the second processed meter readings;
   wherein the data visualization comprises a heat map.

24. A system for controlling a plurality of services for one or more facilities, the system comprising:
   a data store configured to:
   receive a first meter catalog that identifies a first meter connected to the one or more facilities to perform at least one of controlling and monitoring provision of a first service of the plurality of services to the one or more facilities;
   receive a second meter catalog that identifies a second meter connected to the one or more facilities to perform at least one of controlling and monitoring provision of a second service of the plurality of services to the one or more facilities;
   receive first meter readings from the first meter, wherein the first meter readings are indicative of provision of the first service; and
   receive second meter readings from the second meter, wherein the second meter readings are indicative of provision of the second service;
   a processor, communicatively coupled to the data store, configured to:
   automatically process the first meter readings to provide first processed meter readings that are more accurately indicative of provision of the first service than the first meter readings; and
   automatically process the second meter readings to provide second processed meter readings that are more accurately indicative of provision of the second service than the second meter readings;
   a display screen configured to display the first processed meter readings and the second processed meter readings;
   an input device configured to:
   receive input from a first user that establishes at least one of control of the first service and user reporting of the first service; and
   receive input from the first user that assigns a task to a second user to take an action in connection with at least one of the displayed processed meter readings; and
   a transmission device configured to transmit a signal to the second user, specifying the assigned task.

25. The system of claim 24, wherein the first service is provided by a first vendor and the second service is provided by a second vendor different from the first vendor;
   wherein the data store is configured to receive the first meter readings independently of recordation of the first vendor in the data store;
   wherein the data store is configured to receive the second meter readings independently of recordation of the second vendor in the data store.

26. The system of claim 24, wherein the processor is further configured, prior to receiving the first meter catalog, to:
   initiate connection of the data store to the first meter via the Internet;

initiate automatic discovery of the first meter via the Internet; and initiate transmission of the first meter catalog to the data store over the Internet.

27. The system of claim 24, wherein the processor is further configured, prior to processing the first meter readings and prior to processing the second meter readings, to:

automatically normalize the first meter readings; and automatically normalize the second meter readings such that the first meter readings and the second meter readings are on a common time scale.

28. The system of claim 24, wherein the processor is further configured to process the first meter readings by:

automatically identifying a spike in the first meter readings;

automatically analyzing the spike to determine that the spike is not indicative of provision of the first service; and automatically modifying the first meter readings to remove the spike.

29. The system of claim 24, wherein the processor is further configured to process the first meter readings by:

automatically identifying a flatline in the first meter readings;

automatically analyzing the flatline to determine that the flatline is not indicative of provision of the first service; and automatically modifying the first meter readings to remove the flatline.

30. The system of claim 24, wherein the display screen is further configured to display a sentence structure with user-selectable terms that can be used to specify at least one control condition and a control action that is to be automatically executed if the at least one control condition is satisfied;

wherein the input device is configured to receive the input from the first user by receiving a selection from the first user of at least one of the users selectable terms.

31. The system of claim 24, wherein the input device is configured to receive the input from the first user by:

receiving at least one control condition from the first user; and receiving a control action from the first user, wherein the control action is to be automatically executed if the at least one control condition is satisfied;

wherein the processor is further configured to:

automatically compare the first processed meter readings with the at least one control condition;

in response to comparison of the first processed meter readings with the at least one control condition, automatically determine that the at least one control condition has been satisfied; and in response to determining that the at least one control condition has been satisfied, automatically initiate execution of the control action by initiating an action selected from the group consisting of:

modifying provision of the first service; and transmitting a notification to the first user indicating that the at least one control condition has been satisfied.

32. The system of claim 24, wherein the display screen is further configured to display a data visualization depicting the first processed meter readings and the second processed meter readings;

wherein the data visualization comprises a heat map.

* * * * *